US007148285B2

(12) United States Patent
Clark et al.

(10) Patent No.: US 7,148,285 B2
(45) Date of Patent: Dec. 12, 2006

(54) COATED CARBON BLACK PELLETS AND METHODS OF MAKING SAME

(75) Inventors: Dale Clark, Amarillo, TX (US); Jeffrey J. Lopata, Winchester, MA (US); Jameel Menashi, Lexington, MA (US); Sincero Bussolari, Ruina di Ro (IT); Maurizio Lucchi, Modena (IT); Marcel van Meurs, Leiderdorp (NL)

(73) Assignee: Cabot Corporation, Boston, MA (US)

(*) Notice: Subject to any disclaimer, the term of this patent is extended or adjusted under 35 U.S.C. 154(b) by 533 days.

(21) Appl. No.: 10/142,652

(22) Filed: May 9, 2002

(65) Prior Publication Data

US 2003/0144380 A1 Jul. 31, 2003

Related U.S. Application Data

(60) Provisional application No. 60/290,571, filed on May 11, 2001, provisional application No. 60/298,684, filed on Jun. 15, 2001.

(51) Int. Cl.
  *C08K 3/04* (2006.01)
(52) U.S. Cl. ............... 524/495; 524/496; 106/472; 106/476
(58) Field of Classification Search ............... 106/472, 106/476; 524/495, 496
  See application file for complete search history.

(56) References Cited

U.S. PATENT DOCUMENTS

| 1,651,733 | A |   | 12/1927 | Sheppard et al. |
| 2,086,997 | A |   | 7/1937  | de Stubner ............ 134/58 |
| 3,353,974 | A |   | 11/1967 | Trimble et al. ......... 106/31 |
| 3,429,958 | A |   | 2/1969  | Walcott et al. ........ 264/117 |
| 3,787,562 | A |   | 1/1974  | Heller et al. .......... 423/445 |
| 3,856,699 | A |   | 12/1974 | Miyano et al. ......... 252/316 |
| 3,872,040 | A | * | 3/1975  | Mollohan et al. ....... 524/277 |
| 3,881,942 | A |   | 5/1975  | Buckwalter ............. 106/22 |
| 3,973,983 | A |   | 8/1976  | Jordan et al. ......... 106/307 |
| 3,992,218 | A |   | 11/1976 | Suetsugu et al. ....... 106/307 |
| 4,075,157 | A |   | 2/1978  | Johnson .............. 260/42.47 |
| 4,105,464 | A |   | 8/1978  | Osswald et al. ........ 106/307 |
| 4,132,671 | A |   | 1/1979  | Deininger et al. ...... 252/445 |
| 4,136,975 | A | * | 1/1979  | Forseth ............... 366/325.2 |
| 4,230,501 | A |   | 10/1980 | Howard et al. ......... 106/308 |
| 4,263,268 | A |   | 4/1981  | Knox et al. ........... 423/449 |
| 4,277,288 | A |   | 7/1981  | Lawrence et al. ...... 106/309 |
| 4,285,994 | A |   | 8/1981  | Pearce et al. ......... 427/222 |
| 4,310,483 | A | * | 1/1982  | Dorfel et al. ......... 264/117 |
| 4,318,824 | A |   | 3/1982  | Turner ................ 252/421 |
| 4,329,265 | A |   | 5/1982  | Hallenbeck ............ 524/496 |
| 4,366,138 | A |   | 12/1982 | Eisenmenger et al. ... 423/445 |
| 4,464,203 | A |   | 8/1984  | Belde et al. .......... 106/308 |
| 4,484,952 | A |   | 11/1984 | Bes et al. ............ 106/308 |
| 4,503,027 | A |   | 3/1985  | Cheng ................. 423/450 |
| 4,518,434 | A |   | 5/1985  | Wilder ................ 106/307 |
| 4,526,707 | A |   | 7/1985  | Kutsuwa et al. ........ 252/511 |
| 4,540,560 | A |   | 9/1985  | Henderson et al. ..... 423/450 |
| 4,557,306 | A |   | 12/1985 | Graves ................ 152/548 |
| 4,569,834 | A |   | 2/1986  | West et al. ........... 423/460 |
| 4,596,669 | A |   | 6/1986  | Kleiner et al. ........ 252/511 |
| 4,629,758 | A |   | 12/1986 | Kawaguchi et al. ..... 524/495 |
| 4,631,304 | A |   | 12/1986 | Wilder ................ 523/215 |
| 4,724,002 | A |   | 2/1988  | Shibata et al. ........ 106/31 |
| 4,748,168 | A |   | 5/1988  | Kawakami et al. ...... 524/474 |
| 4,764,547 | A |   | 8/1988  | Hatanaka et al. ...... 523/215 |
| 4,767,465 | A |   | 8/1988  | Nakamura et al. ...... 106/413 |
| 4,772,422 | A |   | 9/1988  | Hijikata et al. ....... 252/511 |
| 4,788,241 | A |   | 11/1988 | Cornell et al. ........ 524/311 |
| 4,791,016 | A |   | 12/1988 | Schulte et al. ........ 428/220 |
| 4,818,439 | A |   | 4/1989  | Blackledge et al. .... 252/511 |
| 4,820,751 | A |   | 4/1989  | Takeshita et al. ..... 523/215 |
| 4,836,998 | A |   | 6/1989  | Loutfy et al. ......... 423/460 |
| 4,858,552 | A |   | 8/1989  | Glatt et al. .......... 118/19 |
| 4,933,314 | A |   | 6/1990  | Marumo et al. ........ 502/416 |
| 4,946,887 | A |   | 8/1990  | Takino et al. ........ 524/495 |
| 4,973,463 | A |   | 11/1990 | Nakai ................. 723/445 |
| 5,087,436 | A |   | 2/1992  | Roy ................... 423/461 |
| 5,093,407 | A |   | 3/1992  | Komai et al. ......... 524/495 |
| 5,100,637 | A |   | 3/1992  | Nakai ................. 423/445 |
| 5,110,576 | A |   | 5/1992  | Soeda et al. ......... 423/445 |
| 5,124,396 | A |   | 6/1992  | Branan, Jr. et al. ... 524/496 |
| 5,168,106 | A |   | 12/1992 | Babcock et al. ....... 524/495 |
| 5,171,774 | A |   | 12/1992 | Ueno et al. .......... 524/495 |

(Continued)

FOREIGN PATENT DOCUMENTS

FR  2 012 284  3/1970

(Continued)

OTHER PUBLICATIONS

International Search Report for PCT/US02/14810.

(Continued)

*Primary Examiner*—Edward J. Cain

(57) ABSTRACT

A method of producing coated carbon black pellets is disclosed and includes contacting carbon black pellets with a coating agent to at least partially coat the individual carbon black pellets with the coating agent. The amount of coating agent applied to the carbon black pellets is preferably from about 1% or less by weight to about 25% by weight based on the total weight of the coated carbon black pellets. Coated carbon black pellets produced by the method are also provided and exhibit excellent attrition resistance, excellent dispersibility in various elastomeric, polymeric, and other compositions, are substantially dust-free, and are free-flowing. Additionally, such coated carbon black pellets can confer beneficial processing properties on elastomeric compositions formed from the pellets, such as improved viscosity and resistance to mold fouling.

49 Claims, 11 Drawing Sheets

U.S. PATENT DOCUMENTS

| | | | | |
|---|---|---|---|---|
| 5,187,223 | A | 2/1993 | Asatsuma et al. | 524/496 |
| 5,190,582 | A | 3/1993 | Shinozuka et al. | 106/20 |
| 5,198,205 | A | 3/1993 | Yoshii et al. | 423/445 |
| 5,212,226 | A | 5/1993 | Soeda et al. | 524/496 |
| 5,216,066 | A | 6/1993 | Sandstrom et al. | 524/495 |
| 5,225,475 | A | 7/1993 | Misono | 524/496 |
| 5,231,129 | A | 7/1993 | Misono | 524/496 |
| 5,234,627 | A | 8/1993 | Damschroder | 252/502 |
| 5,236,503 | A | 8/1993 | Jones | 118/303 |
| 5,262,471 | A | 11/1993 | Akao | 524/496 |
| 5,264,521 | A | 11/1993 | Mukai et al. | 524/496 |
| 5,288,788 | A | 2/1994 | Shieh et al. | 524/495 |
| 5,294,253 | A | 3/1994 | Carlson et al. | 106/475 |
| 5,320,820 | A | 6/1994 | Yoshii et al. | 423/449 |
| 5,321,072 | A | 6/1994 | Misono | 524/496 |
| 5,322,874 | A | 6/1994 | Fujii et al. | 524/227 |
| 5,348,818 | A | 9/1994 | Asami et al. | 429/213 |
| 5,382,621 | A | 1/1995 | Laube | 524/496 |
| 5,393,821 | A | 2/1995 | Shieh et al. | 524/495 |
| 5,397,807 | A | 3/1995 | Hitchcock et al. | 521/76 |
| 5,401,313 | A | 3/1995 | Supplee et al. | 106/712 |
| 5,409,979 | A | 4/1995 | Nakai | 524/306 |
| 5,420,193 | A | 5/1995 | Matsue et al. | 524/495 |
| 5,430,087 | A | 7/1995 | Carlson et al. | 524/496 |
| 5,430,088 | A | 7/1995 | Ohashi et al. | 524/496 |
| 5,461,098 | A | 10/1995 | Hitchcock et al. | 524/297 |
| 5,476,612 | A | 12/1995 | Wessling et al. | 252/511 |
| 5,480,626 | A | 1/1996 | Klasen et al. | 423/449.1 |
| 5,512,408 | A | 4/1996 | Baird et al. | 430/110 |
| 5,542,969 | A | 8/1996 | Hirasa et al. | 106/20 C |
| 5,547,498 | A | 8/1996 | Sakaue et al. | 106/20 C |
| 5,575,845 | A | 11/1996 | Belmont et al. | 106/712 |
| 5,587,417 | A | 12/1996 | Nakane et al. | 524/495 |
| 5,596,036 | A | 1/1997 | Discho | 524/496 |
| 5,654,357 | A | 8/1997 | Menashi et al. | 524/495 |
| 5,688,317 | A | 11/1997 | Mackay et al. | 106/476 |
| 5,705,555 | A | 1/1998 | Guilfoy et al. | 524/495 |
| 5,709,740 | A | 1/1998 | Haider et al. | 106/272 |
| 5,712,337 | A | 1/1998 | Discho | 524/496 |
| 5,718,746 | A | 2/1998 | Nagasawa et al. | 106/31.9 |
| 5,725,650 | A | 3/1998 | Flenniken et al. | 106/476 |
| 5,733,480 | A | 3/1998 | Lee et al. | 252/511 |
| 5,739,198 | A | 4/1998 | Sandstrom et al. | 524/493 |
| 5,798,405 | A | 8/1998 | Zimmer et al. | 524/496 |
| 5,814,697 | A | 9/1998 | Akao et al. | 524/495 |
| 5,837,766 | A | 11/1998 | Metro et al. | 524/495 |
| 5,844,037 | A | 12/1998 | Lundgard et al. | 524/496 |
| 5,856,393 | A | 1/1999 | Matsue et al. | 524/493 |
| 5,859,115 | A | 1/1999 | Rennar | 524/492 |
| 5,859,120 | A | 1/1999 | Karl et al. | 524/495 |
| 5,871,706 | A | 2/1999 | Whitehouse | 423/449.2 |
| 5,872,177 | A | 2/1999 | Whitehouse | 524/495 |
| 5,886,092 | A | 3/1999 | Shaw et al. | 524/611 |
| 5,916,962 | A | 6/1999 | Shibata et al. | 524/575 |
| 5,962,575 | A | 10/1999 | Yatsuyanagi et al. | 524/495 |
| 5,985,976 | A | 11/1999 | Wartenberg et al. | 524/495 |
| 5,985,978 | A | 11/1999 | Kikuchi et al. | 524/495 |
| 6,019,829 | A | 2/2000 | Omae et al. | 106/31.65 |
| 6,022,924 | A | 2/2000 | Akao et al. | 524/495 |
| 6,043,298 | A | 3/2000 | Prouse | 523/164 |
| 6,056,933 | A | 5/2000 | Vogler et al. | 423/449.1 |
| 6,086,792 | A | 7/2000 | Reid et al. | 252/511 |
| 6,087,434 | A | 7/2000 | Hisashi et al. | 524/495 |
| 6,096,284 | A | 8/2000 | Kanamaru et al. | 423/450 |
| 6,099,818 | A | 8/2000 | Freund et al. | 423/449.1 |
| 6,099,965 | A | 8/2000 | Tennent et al. | 428/408 |
| 6,107,389 | A | 8/2000 | Oishi et al. | 524/495 |
| 6,132,505 | A | 10/2000 | Linde et al. | 106/429 |
| 6,132,876 | A | 10/2000 | Vogler et al. | 428/408 |
| 6,140,407 | A | 10/2000 | Akutagawa et al. | 524/496 |

FOREIGN PATENT DOCUMENTS

| | | |
|---|---|---|
| GB | 1056994 | 2/1967 |
| GB | 1 150 563 | 4/1969 |
| GB | 2 009 204 A | 10/1977 |
| JP | HEI 2 1990-281046 | 11/1990 |
| JP | HEI 7 1995-188577 | 7/1995 |
| JP | HEI 10 1998-139920 | 5/1998 |

OTHER PUBLICATIONS

Glatt Air Techniques, Inc., www.glattair.com.

* cited by examiner

COATED CARBON BLACK PELLETS AND METHODS OF MAKING SAME

This application claims the benefit under 35 U.S.C. § 119(e) of prior U.S. Provisional Patent Application Nos. 60/290,571 filed May 11, 2001 and 60/298,684 filed Jun. 15, 2001, which are incorporated in their entirety by reference herein.

BACKGROUND OF THE INVENTION

The present invention relates to carbon black pellets and, more particularly, to carbon black pellets exhibiting good handling characteristics, attrition resistance, and good dispersibility when incorporated in polymeric or elastomeric media.

Various treatment methods to improve the bulk handling, dispersibility, and attrition resistance of carbon blacks include wet pelletizing and dry pelletizing techniques. According to such techniques, a carbon black, for example, a fluffy carbon black, is treated with one or more binding agents and then pelletized to form carbon black pellets. Among the various binders used in forming carbon black pellets, wax and other organic components have been utilized. U.S. Pat. No. 5,654,357 to Menashi et al., which is incorporated herein in its entirety by reference, teaches using an organic compound or mixture of organic compounds having certain properties such that, when used to pelletize carbon black have resulted in attrition-resistant carbon black pellets exhibiting good dispersibility in polymeric and elastomeric media.

U.S. Pat. No. 3,353,974 describes mixing carbon black with a wax to form a plastic mix that is then extruded at elevated temperatures. A pigment to matrix weight ratio range of from 10:90 to 90:10 is mentioned.

U.S. Pat. No. 3,429,958 describes producing pelletized carbon black by mixing carbon black with a molten wax in a pin pelletizer. For furnace blacks, the weight ratio of carbon black to wax, recited in this patent, is from 50:50 to 30:70, thus requiring high wax levels.

U.S. Pat. No. 4,230,501 describes mixtures of carbon black with a combination of waxy materials and wax-like materials such as polyethylene glycol or hydrocarbon resins. A variety of mixtures are described at temperatures in excess of the melting point of the wax or wax-like materials. The patent describes compositions containing 51% by weight to 85% by weight pigment that can be easily dispersed and let down directly into thermoset and thermoplastic resins.

U.S. Pat. No. 4,285,994 describes free-flowing pigments produced by tumbling together a finely divided wax with a powdered pigment. The tumbling process, when conducted at ambient temperatures, reportedly results in the coating of the wax particles by the pigment. When conducted at elevated temperatures, the pigment absorbed the wax. The pigment contents of the resulting products are reported as ranging from 70% by weight to 95% by weight.

U.S. Pat. No. 4,310,483 describes mixtures of carbon black with pentaerythritol tetrastearate (PETS) that are then pelletized in a tilting pan granulator at 100° C. The patent describes a composition containing a ratio of from 2 parts by weight to 50 parts by weight granulating auxiliary to 100 parts by weight additive (pigment).

U.S. Pat. No. 4,484,952 describes carbon black dispersed in a molten organic carrier consisting of a mono or tetraester of pentaerythritol and stearic acid, stearylamide, ethylene bisstearylamide or hydrogenated castor oil. The resulting dispersion is then prilled (i.e., sprayed) to form free flowing pellets. The patent describes resulting products containing from 15% by weight to 95% by weight pigment.

U.S. Pat. No. 4,569,834 describes the use of an aqueous emulsion of wax to pelletize carbon black in a pin pelletizer. Waxes described in the patent as suitable are substituted and unsubstituted polyalkene waxes with a most preferred additive being a surface oxidized polyethylene having a molecular weight of from 1800 to about 5000. The patent reports resulting pelletized products exhibited enhanced dispersibility characteristics. The patent also reports that the amount of aqueous emulsion used should be sufficient to provide from 1 to 10 parts by weight oxidized polyethylene per 100 parts by weight of dry carbon black pellets.

All patents, patent applications, and publications mentioned throughout this application are incorporated in their entirety herein by reference.

A need exists for producing carbon black pellets that are attrition resistant, exhibit good handling and dispersibility properties, and use lower levels of wax or organic compound.

It is desirable to provide carbon black pellets having even better attrition resistance, handling properties, and dispersibility than carbon black pellets currently available.

It is also desirable to provide coated carbon black pellets with properties that improve and enhance the production of rubbers that are formed from the coated carbon black pellets.

It is also desirable to provide coated carbon black pellets that offer improved viscosity properties, which improves flow characteristics and reduces mold fouling.

SUMMARY OF THE PRESENT INVENTION

In accordance with the purposes of the present invention, as embodied and described herein, the present invention relates to a method of making coated carbon black pellets by at least partially coating carbon black pellets with a coating agent having the following characteristics:

a) a melting point of at least 25° C., and, preferably higher than 45° C.; and b) when molten, wets carbon black pellets that are to be coated.

Preferably, the coating agent also exhibits the following characteristics:

c) when molten and at the coating temperature employed, exhibits less than 5% decomposition or degradation; and d) when molten and at the coating temperature employed exhibits a viscosity below 5 Pa·s at a shear rate of 10 s$^{-1}$.

According to the present invention, pre-formed carbon black pellets made from a wet pelletizing, dry pelletizing, or other suitable pellet-forming procedure are at least partially coated or encapsulated with the coating agent to form coated carbon black pellets. The coating agent may be a wax or organic compound that is solid at 25° C., and that wets carbon black pellets, that exhibits substantially no degradation or decomposition at the coating temperature employed, and that exhibits a substantially low viscosity, for example, less than 5 Pa·s at a shear rate of 10 s$^{-1}$.

The coating agent is preferably used in an amount of from about 0.10% by weight to about 25% by weight based on the total weight of the coated carbon black pellets. Herein, the term "coated carbon black pellets" refers to carbon black pellets that are at least partially coated with a coating agent in accordance with the present invention.

The present invention also relates to a method of making coated carbon black pellets by coating pre-formed carbon black pellets with a coating agent as described herein.

The present invention also provides a method of using a coated carbon black pellet according to the present invention as a masterbatch or concentrate, or in a masterbatch or concentrate.

The present invention also provides coated carbon black pellets with properties that improve and enhance the production of rubbers formed from the coated carbon black pellets.

The present invention also provides coated carbon black pellets that offer improved properties, such as Gottfert or Mooney Viscosity, in the context of injection molding, and also offer enhanced flow properties and resistance to mold fouling.

It is to be understood that both the foregoing general description and the following detailed description are exemplary and explanatory only and are only intended to provide a further explanation of the present invention, as claimed. The accompanying drawings, which are incorporated in and constitute a part of this application illustrate result of several experiments relating to of the present invention and together with the detailed description serve to explain the principles of the present invention.

BRIEF DESCRIPTION OF THE DRAWINGS

The foregoing features of this invention will be more readily understood by reference to the following detailed description, taken with reference to the accompanying drawings, in which.

DETAILED DESCRIPTION OF THE PRESENT INVENTION

Figure 1:
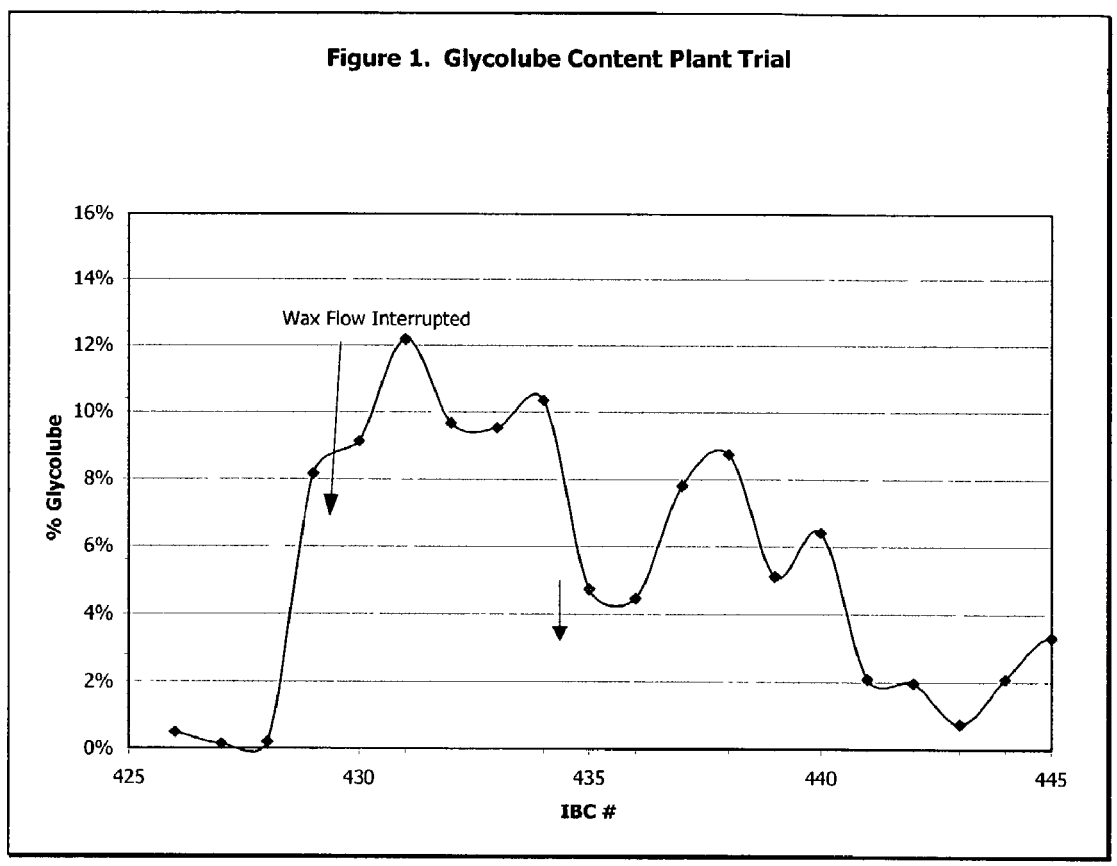
FIG. 1 is a graph showing the amount of coating agent used on the carbon black pellets of various samples according to embodiments of the present invention.

The present invention relates to at least partially coated carbon black pellets that are preferably free-flowing, attrition resistant, and/or readily dispersible in polymeric or elastomeric media. The coated carbon black pellets are preferably used in place of conventional carbon black pellets in applications such as forming carbon black loaded polymer compositions at any desired carbon black loading including loadings equal to or higher than conventional masterbatches, and/or replacing the use of conventional masterbatches for introducing carbon black into polymeric media. Any type of carbon black or carbon product (e.g., carbon fibers, activated carbon, charcoal, and the like) can be used in the present invention.

According to an embodiment of the present invention, carbon black pellets are provided that comprise pre-formed carbon black and from 0.10% by weight or less to about 25% by weight of a coating agent. The pellet is formed and then coated, preferably at a temperature above the melting point of the coating agent. The coating agent coats, at least partially, the carbon black pellet. Preferably, the molten coating agent contacts the carbon black pellets and is absorbed at least in part by capillary action into the pores of the carbon black pellet and at least partially coats the outer surface of the pellet. Upon cooling, the coating agent solidifies resulting in pellets that are preferably free-flowing, attrition resistant, and/or readily dispersible in elastomeric or polymeric media.

The coating agent used in accordance with the present invention may be a wax or organic compound that is solid at 25° C., that wets carbon black pellets, that exhibits substantially no degradation or decomposition at the coating temperature employed, and that exhibits a substantially low viscosity, for example, less than 5 Pa·s at a shear rate of 10 $s^{-1}$. Preferably the coating agent is a wax or organic compound having the following characteristics:

a) a melting point of at least 25° C., and, preferably higher than 45° C.; and b) when molten, wets carbon black pellets that are to be coated.

Preferably, the coating agent also exhibits the following characteristics:

c) when molten and at the coating temperature employed exhibits less than 5% decomposition or degradation; or d) when molten and at the coating temperature employed exhibits a viscosity below 2 Pa·s at a shear rate of 10 $s^{-1}$, or both.

The coating agent preferably contains at least one organic compound or a mixture of organic compounds exhibiting the properties identified above and preferably is at least one of a non-polymeric organic compound, an organic thermoplastic homopolymer, an organic thermoplastic copolymer, or a wax, or combinations thereof. Examples of suitable coating agents include, but are not limited to, simple organic compounds, polymeric materials, blends of simple organic compounds, thermoplastic homopolymers and copolymers, blends of homo- and co-polymers as well as blends of simple organic compounds with polymeric materials. The coating agent can be at least one organic acid, at least one organic acid ester, or combinations thereof. The coating agent can also be one or more fatty acids or fatty acid esters, or combinations thereof. A preferred coating agent is pentaerythritol tetrastearate and/or derivatives thereof or polyethylene wax or derivatives thereof or EBS or derivatives thereof.

Other preferred coating agents include fatty acids, fatty acid esters, waxes, waxes with plasticizers, or combinations thereof. The coating agent may also be a fatty acid of the formula $CH_3—(CH_2)_n—COOH$, where n is an integer from 10 to 20, or a wax thereof, or a combination thereof. Alternatively, other preferred coating agents may include myristic acid, linioleic acid, linolenic acid, palmitic acid, fatty acids, and mixture of hydrocarbons and fatty acids, such as Polyplastol™ 15 available at Great Lakes Chemical Corporation, Plastmoll DOA, Sunproof wax, or combinations thereof, as well functional equivalents or similar compounds to those listed. These coating agents preferably have the characteristic a)–d) but it is not necessary.

The coating agent is preferably an organic compound or compound mixture that is compatible with the medium in which the coated carbon black pellet product is to be dispersed. A compatible compound is one which is soluble or miscible with the application medium, at least at the level at which it is employed and at the compounding temperature employed.

In a preferred embodiment, the coating agent is a polymeric wax, such as polyethylene wax, ethylene vinyl acetate wax, and the like, or a mixture of these waxes. Such waxes contemplated for use are well known in the art and are supplied commercially by various companies such as Allied Signal, under the tradenames of A-C® polyethylenes and A-C® co-polymers, BASF corporation materials sold under the tradenames of LUWAX® and Morttan Waxes, and Eastman Kodak materials sold under the tradename of EPOLENE WAXES. Preferably, the waxes used are mold release agents and/or lubricants in rubber, plastics, and coating applications. In addition, they can preferably function as pigment dispersants and are often employed in conventional carbon black masterbatch formulations.

The coating agent of the present invention can optionally include conventional additives, such as, but not limited to, antioxidants, UV stabilizers, and the like. Typically, these additives are dissolved or suspended in the wax or organic compound. As an option of the present invention, if the additive, such as an antioxidant or UV stabilizer is a wax or organic compound satisfying the previously described characteristics, then such an additive would be sufficient alone as the coating agent for purposes of the present invention.

The amount of coating agent used in accordance with the present invention preferably ranges from about 0.10% or less by weight to about 25% by weight based on the weight of the coated pelletized product. Amounts greater than 20% by weight can be used, such as from about 20% by weight to about 50% by weight or higher. More preferably, the coating agent is employed in an amount of from about 1% by weight to about 20% by weight, for example, from about 5% by weight to about 15% by weight and, more preferably, from about 1% by weight to about 5% by weight based on the total weight of the coated pelletized product.

The agglomeration method used to form the pellets to be coated according to the present invention can be achieved by any convectional pelletizing techniques, such as but not limited to, wet pelletization, dry pelletization, and/or pin pelletization methods. Methods of forming the carbon black pellets to be coated in accordance with the present invention include those methods described in U.S. Pat. No. 5,654,357 which is incorporated herein in its entirety by reference. The carbon black pellets to be coated in accordance with the present invention may themselves include a binder or pelletizing agent, for example, a wax or organic compound exhibiting the characteristics desired of the coating agents used in accordance with the present invention. In lieu of carbon black, other carbon products or fillers can be used to form the pellets.

According to the present invention, carbon black pellets can be coated with the coating agent using any suitable coating technique. Spray coating techniques can result in substantially completely and uniformly coated pellets. Exemplary coating devices include the Wurster HS atomized nozzle processing insert and the Glatt AGT spray drying and agglomeration device, both available from Glatt Air Techniques, Inc. of Ramsey, N.J. Other coating devices and methods that are suitable for use in the present invention include the devices and methods described, for example, in U.S. Pat. No. 4,858,552 and in U.S. Pat. No. 5,236,503, both of which are incorporated herein in their entireties by reference.

According to the present invention, carbon black pellets are preferably heated or maintained at a temperature above the melting point of the coating agent and can be coated with the agent. Due to the heat of the pellets, the coating agent can preferably migrate into the pellet interior to form, after cooling, solid interaggregate bridges.

According to some embodiments of the present invention, the molten coating agent is sprayed onto cool preformed pellets. Under such conditions, when the heat content of the molten agent is small, the molten agent can solidify before it penetrates a substantial distance into the pellets. Under these conditions encapsulated pellets are formed consisting of a shell rich in coating agent and a core rich in carbon black. The agent-rich shells preferably confer strength to the pellets rendering the pellets attrition resistant and dust-free. The carbon black pellet may be partially coated, substantially coated, or entirely coated with one or more coating agents. Further, the carbon black pellet can have more than one coating agent coated thereon and may have two or more layers of the same or different coating agents forming a multi-layered coated pellet.

In addition to process simplification, a second advantage offered by the encapsulation approach is that it permits control of the tradeoff between pellet strength and pellet dispersibility. Pellet strength increases with pellet density and with the level of wax employed. Pellet dispersibility is degraded as pellet density is increased. According to the present invention, coating agents that are compatible with the medium in which the pellets are dispersed, at worst, do not adversely affect dispersibility. Accordingly, through the selection of an appropriate coating agent, dust-free carbon black pellets with desired dispersibility characteristics can be formed.

The coated pelletized products, after cooling to a temperature below the melting point of the coating agent, preferably consist of free-flowing, hard, attrition resistant, non-dusting pellets which have excellent dispersability characteristics. In other words, the tradeoff between improvement in bulk handling and degradation in dispersability is preferably improved compared to conventional carbon black pellets. In many instances, the coated pelletized products of the present invention can be used to form concentrates, or more advantageously can be used directly in place of concentrates for introducing carbon black into polymeric media.

Carbon black is used as the starting material for a variety of products having great industrial or commercial significance, particularly rubber, elastomer, or co-polymer formulations. Therefore, it would be useful to coat the carbon black pellets of the present invention with compounds that improve the properties of the carbon black pellets when subject to further processing. As noted above, some of the compounds noted above are mold release agents and/or lubricants in rubber, plastics, and coating applications, or can preferably function as pigment dispersants and are often employed in conventional carbon black masterbatch formulations. Examples of such polymers include, but are not limited to, thermoplastic polyolefins (TPO), polyethylene (PE), polypropylene (PP), copolymers of propylene, ethylene propylene rubber (EPR), ethylene propylene diene terpolymer (such as EPDM), acrylonitrile butadiene styrene (ABS), acrylonitrile EPDM styrene (AES), polyvinylchloride (PVC), polystyrene (PS), polyamides (PA, such as PA6, PA66, PA11, PA12, and PA46), polycarbonate (PC), polybutylene terephthalate (PBT), polyethylene terephthalate (PET), polyphenylene oxide (PPO), and polyphenylene ether (PPE). Therefore, various additives that can be used as coating compounds to produce the carbon pellets of the present invention have also been evaluated as to the beneficial properties that such additives confer when the pellets are processed further into rubber, elastomer, or co-polymer formulations. Using additives that confer beneficial properties on such "downstream" applications is highly desirable from an efficiency standpoint, since the additives improve the handling properties of the carbon black pellets, and also eliminate the need to further treat the carbon black in order to enhance its conversion into other products. For example, the coated carbon black of the present invention provides improved flow characteristics and prevents, or substantially reduces, mold fouling.

The present invention will be further clarified by the following examples, which are intended to be purely exemplary of the present invention.

EXAMPLES

Example 1

Laboratory Scale Experiments

Plant derived wet process VULCAN 9A32 pellets (Cabot Corporation) in an amount of 1 kg were placed in a 0.29 m by 0.36 m drum rotated at a speed of 25 rpm. About 250 g of molten Lonza pentaerythritol tetrastearate (PETS) wax having a temperature of about 100° C. was sprayed onto the rotating pellet bed maintained either at about 100° C. (spray/hot) or at ambient temperatures (spray/cold). To ensure uniform coverage, the spray nozzle was moved several times along the length of the bed during the spraying operation. Thereafter, the pellets were tumbled for a further hour after which the products were collected for characterization.

The tap densities, wax levels, pellet crush strength (PCS) values, mass pellet strength (MPS) values, attrition resistances, and pellet size distributions of the products were determined. Because of the low degree of attrition observed, attrition resistances in this case were defined as the difference between the 1 and 90 minute dust values. A change in the pellet size and size distribution between the preformed pellets and those collected after spraying provided one measure of the extent of pellet agglomeration or breakdown during the rolling/spraying operation. The pellet sizes were assumed to be normally distributed. Thus, the screen analysis data were fitted to a normal distribution and the mean pellet size, d, and the relative standard deviation, $\sigma/d$, of the distribution was calculated. The 1 minute dust value was also determined. The results obtained for the conventional wet process pellets and those containing wax are compared in Table 1.

TABLE 1

Comparison Of Properties of Wax Bound VULCAN 9A32 Pellets Formed By Spraying With Those Of Their Conventional Precursor Wet Process Pellets

| Approach | Wax % | Tap Density, g/cc | | Strength | | | 1' Pellet Props. | | |
| | | With Wax | Wax-Free | PCS g | MPS kg | *Attrition | Dust % | d mm | σ/d |
| --- | --- | --- | --- | --- | --- | --- | --- | --- | --- |
| Pin Pelletized | 0 | 0.35 | 0.35 | 11 | 7 | 3.5 | 7.9 | 0.49 | 0.50 |
| Spray/Hot | 19.1 | 0.43 | 0.35 | 48 | 29 | 2.8 | 6.7 | 0.51 | 0.47 |
| Spray/Cold | 17.9 | 0.39 | 0.32 | 32 | 16 | 7.1 | 7.8 | 0.59 | 0.63 |

*Attrition Resistance, defined as difference between the 90 and 1 minute dust values.

A comparison of the pellet size results of the product formed by spraying onto heated pellets with those of the precursor pellets indicates that both products have reasonably comparable 1 minute dust levels, mean pellet sizes, and relative widths of pellet size distributions. Moreover, the tap density of the precursor pellets is identical with that calculated for the carbon black fraction in the wax-bound material on a wax-free basis. These observations support the view that the molten wax migrates into the preformed pellets without changing the precursor pellet characteristics. Further, since the precursor pellets are relatively dense, the number of aggregates in close proximity, and to which the wax can migrate to form interaggregate bridges, is relatively large. As a consequence and as demonstrated by the PCS and MPS data, the strengths of the wax-bound pellets are much larger than those of the precursor pellets from which they are derived. The attrition resistances of the pellets are high and, for this reason, a 90-minute attrition time was used to accentuate their differences. Nevertheless, the observed difference between the precursor pellets and the wax-bound product is relatively small.

A comparison of the pellet characteristics of the product formed by spraying onto cold pellets with those of the precursor pellets indicates that the former product has a larger mean pellet size and a larger width of the pellet size distribution. This suggests that some of the precursor pellets become stuck to each other. As a consequence, the wax-free tap density of the wax-bound pellets is somewhat smaller than that of the precursor pellets. Further, pellet strength and attrition resistance appears to be inferior to those of the wax-bound pellets formed by the spraying onto hot pellets.

An energy balance can be used to analyze further the results of molten wax spraying. The heat capacity of carbon black at 300° K is estimated to be about 720 J/(kg ° K). Differential scanning calorimetry data suggest that the energy required to raise the temperature of the Lonza wax from 25 to 100° C., including the latent heat of fusion, is about $165 \times 10^3$ J/kg. The latent heat of fusion of the wax is about $100 \times 10^3$ J/kg. If wall effects are neglected and the temperature of the carbon black and wax before pelletizing and the weight fraction wax in the pellets are known, then the average carbon black pellet temperature can be calculated. For the case where the initial molten wax temperature is 100° C. and the initial carbon black temperature is 25° C., the wax containing pellets achieve a temperature of 63° C. (the melting point of the wax) when the pellets contain about 17 weight % wax. Under these conditions, capillary forces will transport most of the wax into the pellet interior before the wax solidifies. At reduced wax levels, solidification takes place before complete wax penetration takes place. The extent of penetration decreases as the molten wax temperature and its level in the pellets are reduced. For all the wax to solidify near the pellet surface in the form of a thin shell, some heat removal is preferred. It is likely that this occurred in the present study because the wax was added over a prolonged time period and because the cold metal drum, having a relatively large area in contact with a limited volume of carbon black, served as a heat sink. The observation (Table 1) that the mean pellet size of the wax-bound material is larger than that of the precursor pellets suggests that pellet growth has taken place. This, most likely, occurred because some of the pellets stuck to each other by the formation of solid inter-pellet bridges, supporting the assertion that some heat removal took place so that the outer pellet layer was wax-rich.

TABLE 2

Uniformity and Density of Pellets in Differing Size Ranges

| Production Process | Pellet Size Range, mm | Wax Level Weight % | Tap Density, g/cc With Wax | Tap Density, g/cc Wax-Free |
|---|---|---|---|---|
| Wet Process | 0.50 To 1.0 | 0 | — | 0.38 |
| | 0.25 To 0.50 | 0 | — | 0.37 |
| | 0.125 To 0.25 | 0 | — | 0.34 |
| Spray/Heated Wet Process | 1.0 To 2.0 | 35 | *ND | ND |
| | 0.50 To 1.0 | 20 | 0.47 | 0.38 |
| | 0.25 To 0.50 | 15 | 0.45 | 0.38 |
| | 0.125 To 0.25 | 17 | 0.44 | 0.36 |
| Spray/Cold Wet Process | +2.0 | 53 | ND | ND |
| | 1.0 To 2.0 | 38 | ND | ND |
| | 0.50 To 1.0 | 12 | 0.40 | 0.35 |
| | 0.25 To 0.50 | 10 | 0.39 | 0.35 |
| | 0.125 To 0.25 | 14 | 0.40 | 0.34 |

*ND = Not determined

The uniformity of distribution of the wax in the different pellet size fractions was determined for the wax-bound VULCAN 9A32 pellets. The tap densities in the differing pellet size fractions of the wax-bound pellets as well those of the preformed, untreated wet process pellets were evaluated. The results obtained are summarized in Table 2.

The wax levels in the products formed by spraying increase with increasing pellet size. Further, although not statistically reliable, the available density data are consistent with the view that the tap densities increase with pellet size. The trend of increased wax levels in the larger pellet size fractions is attributed to the fact that larger pellets rise to the top of a rotating bed and, hence, are exposed for a greater time to the wax spray. This effect is counteracted, at least to some extent, because the fraction of the spray absorbed by a pellet is proportional to its surface area while its concentration is proportional to the pellet volume, that is, the wax level in pellets exposed for the same time period to a spray should vary with $d^2/d^3$, or, $1/d$. The present contentions suggest that the extent of non-uniformity attained will depend on the experimental conditions used to apply the wax.

Plant Scale Experiments

A plant scale method of treating carbon black with wax was studied. The method is herein referred to as a wet-process method and involved spraying molten wax onto warm, dry wet-processed carbon black pellets. This was effected by means of a single bifluid spray placed in the front end of a rotating dry drum while dried wet-processed pellets were fed at a substantially constant rate into the drum.

No significant operational problems were encountered during the trial, indicating that the method can be implemented without much difficulty.

One objective of the trial described below was to obtain a carbon black product that would have superior attrition resistance compared to BLACK PEARLS® 800 product available from Cabot Corporation. To achieve the strength and attrition resistance desired, a coating agent was used to substantially coat carbon black pellets in accordance with the present invention. The coating agent used was a fatty acid ester, pentaerythritol tetrastearate (PETS), obtained from Lonza Chemical under the trade name of Loxiol EP 8578.

As just mentioned, the purpose of the trial was to coat dried wet process pellets. The pellets were formed by pin pelletizing the fluffy black with water in a pin pelletizer. The resultant pellets were dried and conveyed to a first Silo, Silo 1, where they were packed into individual bulk containers (IBC's). The conveying distance from the dryer to the first silo, Silo 1, was large (resulting in some pellet degradation). The containers were then transported to a location in front of a conventional dry drum and their contents fed to the rotating dry drum at a nominal rate of about 900 kg/hr where they were treated with a spray of molten wax. The dry drum had a diameter of 2.44 m (8 feet) and a length of 12.2, m (40 feet). The contents of four or five IBC's were fed to the drum prior to initiating spraying. A capability for maintaining the drum contents above the melting point of the wax was conceivable but not installed for this trial.

A single Delavan Bifluid Air Atomizing Spray Nozzle (Model #32163-11 Nozzle with 707-93 Cap assembly) was used to spray the molten wax onto the pellets. The nozzle had a nominal flow of 4/min (1 gallon/min) with a 50° hollow cone spray pattern. The spray assembly was located 3 m (10 ft.) from the front of the drum. Assuming a bed depth greater than 30 cm (12") in the drum and also assuming that the nozzle assembly was angled away from the vertical towards the rolling bed, this spray pattern covered a circular area somewhat less than 1.04 m (3.4 ft.) in diameter. This implies that the treatment operation at the feed rate employed could have been carried out in a much smaller drum.

The wax was melted using a steam coil equipped stainless tank and the wax temperature was held close to 100° C. The molten wax was conveyed to the nozzle via an insulated diaphragm pump. The pump was precalibrated. Due to changing black feed rates and changing pump flow rates the target wax levels were not always achieved.

The run was begun at the highest wax level (15% by weight target) and decreased step-wise after 2–4 hours at each condition until reaching a nominal 5% by weight wax level. The coated pellets exiting the dry drum were conveyed by means of screw conveyors to a second silo, Silo II, and then immediately discharged into IBC's.

A total of about 20 IBC's were taken and 1 kg samples were taken from the top of each IBC for testing purposes. In addition, 4 product samples were taken from the drum exit and 4 samples of the BP800 wet process pellets were taken after exiting the first silo, Silo 1.

Sample Characterization

Wax levels in the samples were determined by measuring weight loss after heating under $N_2$ at 650° C. for two hours.

The weight loss data were corrected for moisture and volatiles. The former was found by determining the weight loss after heating at 125° C. The volatiles were determined by measuring the weight loss of the wax-free carbon black at 650° C. Tap densities were determined for screened pellets having a narrow size distribution. Standard testing procedures were used for most of the other characterization studies. Pellet size distribution was measured using ASTM D 1511-97a. The fraction of the sample passing through the 120 mesh sieve was taken as representing the dust content of the sample. Pellet attrition was determined according to the procedure described in ASTM D 4324-97 except for the attrition times employed. The actual times used are described in the text. Individual pellet crush strength was measured using the procedure of ASTM D 3313-95. However, the actual pellet sizes employed departed from those given in the procedure and are described in the text. Mass pellet strength, MPS, was measured in accordance with ASTM D 1937-95.

Results and Discussion:

The wax levels in the IBC's, in the sequence taken, are shown in FIG. 1. The first three samples represent the initial wet process pellets fed to the drum prior to wax addition. As such, they provide an indication of feed pellet quality. Thereafter, the wax level in the pellets rapidly increased, attained a maximum value of about 12% by weight (target level was 15%) and then declined in an erratic fashion. The erratic reduction in wax level demonstrates that the feed rates of the pellets and/or wax were not well controlled. After about IBC # 438, the process was ended.

The feed pellets exiting the first silo (Silo 1) were characterized by the standard 1 minute screen analysis. The size distribution data were taken to be normally distributed and used to calculate the mean pellet size, d, the breadth of the distribution, σ and, hence, the relative standard deviation of the distribution, RSD=σ/d. The 1 minute dust levels and the mean pellet size and the RSD values are summarized in Table 3. The data indicate that the feed pellets had rather small mean diameters, high and variable dust levels, and large RSD values. The mean pellet size and RSD values of Black Pearls® 800 pellets exiting the pin pelletizer and dryer were not measured. However, experience with other grades of blacks made with other pelletizers indicates that they typically have RSD values in the range of 0.3 (narrow size distribution) to 0.4. Pellet degradation, caused by conveying, results in substantial dust formation and is accompanied by an increase in the RSD value.

Dust levels typically encountered with BP800 average 4.0%. The 1 minute dust levels of feed pellets measured after conveying to Silo 1 averaged twice the normal value. Transfer of the pellets from the IBC's to the dry drum, as shown below, caused additional pellet degradation.

TABLE 3

Pellet Size Distribution Data of BP800 Controls

| Sample | Dust, % | Mean Size, mm | RSD |
| --- | --- | --- | --- |
| Control BP800 from Silo 1 | 4.2 | 0.57 | 0.49 |
| Control 2 from Silo 1 | 6.7 | 0.47 | 0.55 |
| Control 3 from Silo 1 | 11.5 | 0.43 | 0.63 |
| Control 4 from Silo 1 | 9.3 | 0.43 | 0.61 |
| Average of BP800 after Silo 1 | 7.9 | 0.48 | 0.57 |

The 1 minute dust levels, mean pellet sizes, and RSD values of the wax treated pellets, measured after packing off from the second silo, Silo 2, are presented in Table 4. When compared to the data in Table 3, further reductions in mean pellet size and substantial (but variable) increases in dust levels and in the RSD values are apparent. As will be shown later, the extent of attrition of the wax treated products, especially at the largest wax levels, is small, indicating little breakdown should have occurred during conveying to and packing off from Silo 2. Nevertheless, the data in Table 4 also indicate that substantial pellet degradation had taken place for the high level wax samples (IBC # 429, 430 and 431). Since laboratory scale studies have shown that the unit operation of wax treatment neither contributes to increased dust levels nor alters the RSD of the sample, it is concluded again that additional degradation took place during transfer of the pellets to the drum.

TABLE 4

Pellet Size Distribution Data For Wax Treated Pellets

| IBC # | Dust, % | Mean Size, mm | RSD | % Glycolube |
| --- | --- | --- | --- | --- |
| 429 | 7.8 | 0.41 | 0.56 | 8.2 |
| 430 | 29.7 | 0.23 | 1.53 | 9.1 |
| 431 | 27.5 | 0.25 | 1.17 | 12.2 |
| 432 | 16.2 | 0.36 | 0.76 | 9.7 |
| 433 | 13.2 | 0.37 | 0.64 | 9.5 |
| 434 | 7.1 | 0.40 | 0.59 | 10.3 |
| 435 | 11.7 | 0.39 | 0.68 | 4.7 |
| 436 | 8.7 | 0.46 | 0.57 | 4.5 |
| 437 | 7.2 | 0.46 | 0.53 | 7.8 |
| 438 | 12.8 | 0.38 | 0.66 | 8.8 |
| Average of Wax Treated Samples | 14.2 ± 8.2 | 0.37 ± 0.07 | 0.77 ± 0.32 | |

The present results demonstrate that formation of coated pelleted products having low dust contents requires using feed pellets with low dust contents. Since feed pellets exiting a dryer typically have low dust levels and since in practice the spraying operation could be effected shortly thereafter in a relatively small drum, no problems are expected with meeting this requirement.

The wax levels and tap densities of pellets in the size range of 0.25 to 0.5 mm (35 to 60 mesh) were measured for samples taken from several IBC's. These quantities were used to compute the tap densities of the pellets on a wax-free basis, giving a measure of the densities of the feed pellets. The results obtained are summarized in Table 5. The tap densities of the pellets increased with wax level. On a wax-free basis, however, a constant value of 0.47±0.01 was obtained, a value typical of that of the feed pellets.

TABLE 5

Wax Contents And Densities of Wax Bound Pellets Formed

| IBC # | Tap Density, g/cc (0.25–0.5 mm) | Wax-Free Tap Density, g/cc | % Glycolube |
|---|---|---|---|
| 429 | 0.520 | 0.478 | 8.16% |
| 430 | 0.518 | 0.470 | 9.13% |
| 431 | 0.557 | 0.489 | 12.19% |
| 432 | 0.539 | 0.487 | 9.67% |
| 433 | 0.529 | 0.479 | 9.54% |
| 434 | 0.483 | 0.460 | 4.74% |
| 435 | 0.482 | 0.461 | 4.46% |
| 436 | 0.504 | 0.465 | 7.81% |
| 437 | 0.519 | 0.473 | 8.75% |
| 438 | 0.496 | 0.470 | 5.12% |
| Average | | 0.473 ± 0.01 | |

*Wax Free bulk density of the product calculated by subtracting the wax's mass contribution to the sample.

The Glycolube contents in different pellet size fractions of several samples were measured and the data obtained are summarized in Table 6. The results show that the wax level in the different pellet size fractions, comprising the bulk of the sample, were similar. The larger pellets (1 to 2 mm size fraction and larger) did have wax levels that tended to be greater than that in the bulk product. However, the mass fraction of these pellets was small (less than about 5%) so that their effect on the average wax content was small. The size fractions making up 90+% of the bulk product had very similar wax contents, indicating that the wax levels in the different pellet size fractions in the sample were remarkably uniform.

TABLE 6

Wax Distribution Among Pellet Size Fractions

| | % Glycolube | | |
|---|---|---|---|
| Screen Size: | IBC 431 | IBC 438 | IBC 448 |
| +2.0 mm | — | — | 2.19% |
| 1.0–2.0 mm | 19.06% | 15.35% | 3.84% |
| 0.5–1.0 mm | 12.43% | 5.41% | 2.50% |
| 0.25–0.5 mm | 11.90% | 8.31% | 2.03% |
| 0.125–0.25 mm | 12.30% | 8.88% | 2.03% |
| Dust | 12.22% | 8.75% | 2.15% |

Figure 2:
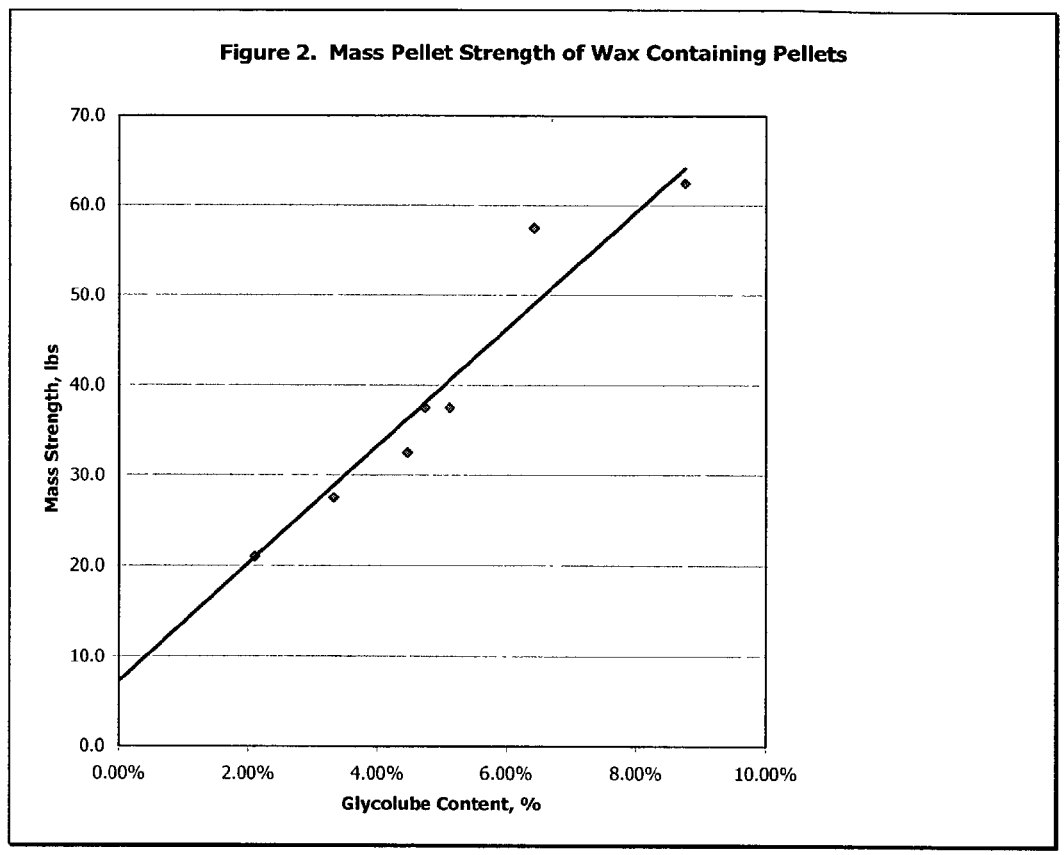
FIG. 2 is a graph showing the relationship between the amount of coating agent and the mass strength in pounds of various coated carbon black pellets made in accordance with the present invention.

The mass pellet strengths (MPS) of the samples and the pellet crush strengths (PCS) of pellets in the size range of 1.0 to 1.18 mm were measured. The wax levels in pellets in the 1.0 to 1.18 mm size fraction were also evaluated because, as just discussed, the wax contents in the larger pellets tended to differ from those in the bulk samples. These data together with wax levels present in the bulk samples are presented in Table 7. The results show that both MPS and PCS increased as the wax level is increased. Moreover, the gains in strength are substantial. The effect of wax level on MPS is depicted in FIG. 2.

TABLE 7

Strength Data for Wet Process Wax Pellets

| IBC # | % Glycolube in Bulk | Mass Pellet Strength, lbs | % Glycolube in 1–1.18 mm pellets | Pellet Crush Strength*, grams |
|---|---|---|---|---|
| BP 800 Control | 0 | 8.5 | 0 | 4.9 |
| 445 | 3.3 | 27.5 | 5.4 | 10.1 |
| 439 | 5.1 | 37.5 | 6.4 | 17.1 |
| 440 | 6.4 | 57.5 | 9.3 | 23.8 |
| 438 | 8.75 | 62.5 | 15.3 | 62.5 |
| 434 | 10.35 | >110 | 18.0 | 61 |

*Pellet Crush Strength determination performed on 1.0–1.18 mm pellets.

There was no heating capability at the drum for the trial. Since relatively cool wet process pellets were fed to the drum (actual temperature was not measured), it was possible that the wax sprayed onto the cool pellets may have solidified before complete absorption into the pellets took place. Incomplete wax absorption can lead to the formation of weaker pellets and to some apparent pellet growth because wax solidifying on the pellet surface can bond pellets together.

To investigate if heating the drum would have provided better pellets, three of the produced samples were rolled in a heated drum. In these experiments, one kilogram samples were rolled at 104° C. (220° F.) for 45 minutes in a 30.5 cm (12") diameter stainless steel drum. Data on the pellet sizes and strengths of the samples, before and after hot rolling, are given in Table 8. The results are essentially unchanged by the hot rolling process. This implies that either maintaining a temperature above the melting point of the wax is unnecessary to achieve maximum strength or that the temperature in the drum was warm enough for the wax to stay molten and wick into the sites of close proximity to form interaggregate bridges. However, it is preferred to maintain the carbon black temperature above the wax melting temperature.

TABLE 8

Comparison of Samples Before And After Hot Rolling

| Tests Performed | IBC 433 (9.5 wt. % Wax) | 434 IBC (10.3 wt. % Wax) | IBC 439 (5.1 wt. % Wax) |
|---|---|---|---|
| Mean Size, Original (mm) | 0.37 | 0.40 | 0.38 |
| Mean Size, After Hot Roll | 0.45 | 0.41 | 0.37 |
| RSD, Original | 0.64 | 0.56 | 0.85 |
| RSD, After Hot Roll | 0.47 | 0.48 | 0.81 |
| MPS, Original (lbs) | >110 | >110 | 37.5 |
| MPS, After Hot Roll | >110 | >110 | 42.5 |
| PCS, Original (grams) | 58 | 61 | 17 |
| PCS, After Hot Roll | 52 | 50 | 15 |
| Tap Density*, Original | 0.53 | 0.53 | 0.50 |
| Tap Density, After Hot Roll | 0.52 | 0.53 | 0.48 |

*Tap Density of 0.25–0.5 mm pellet fraction

The attrition resistances of the coated products were evaluated using a modification of the standard ASTM procedure. This method, ASTM Standard (D4324, Pellet Attrition), calls for screening and tapping the sample on a 120 mesh sieve for 5 and 20 minutes and then equating attrition to the dust generated between 5 and 20 minutes, expressed as a fraction of the original sample weight. In the present study, to increase the amount of dust generated, the tapping and screening operation was extended from 20 to 60 minutes. Results of this testing are given in Table 9 and show that attrition resistance improved as wax level was increased.

TABLE 9

Attrition Resistance of Wax Treated Wet Process Pellets

| IBC # | Attrition, % | % Glycolube |
|---|---|---|
| Control (BP800) | 3.76 | 0 |
| 445 | 1.19 | 3.3 |
| 439 | 0.59 | 5.1 |
| 434 | 0.25 | 10.3 |

Example 2

Dispersion and Staining Studies

The wax bound pellets of the present invention can be used in place of masterbatch compositions in various formulations without contaminating processing equipment. To evaluate their efficacy the dispersibility and staining characteristics of sample 431, coated with 12.2% PETS wax, was compared against that of a conventional masterbatch containing 30 weight % BP 800 and conventional wet process BP 800 pellets in a polycarbonate polymer (GE Lexan 141). All products were dispersed on a laboratory Buss PR46 unit at a 1 weight % carbon black loading. The following results were achieved:

Macrodispersion was assessed by measuring undispersed particles having sizes greater than 0.420 mm (40 mesh), 0.25 mm (60 mesh) and 0.149 mm (100 mesh) sizes. An analysis showed that the best quality product was obtained with the masterbatch and the worst with BP 800. The coated product, however, was close in quality to that of the regular pellets.

Jetness—all jetness values were quite similar with that of the masterbatch being somewhat jetter.

Pressure Rise—(measure of microdispersion quality) was assessed by passing 1200 g of compound (12 g carbon black) through a 44 micron screen pack (325 mesh screen). The measured pressure rise was smallest for the compound containing the coated product, closely followed by that made with masterbatch and highest for the compound with conventional BP 800 pellets.

Handling—unlike conventional BP 800 which leaves a lot of dust on the walls of plastic bags, the coated product left little trace of its presence in emptied plastic bags.

These studies show that the wax coating process gives pellets with improved handling and, to some extent, improved dispersibility characteristics. Additional improvements in dispersibility can be achieved by using lower density feed pellets such as those made by the dry pelletizing process.

Example 3

Spheron® 4000 Flowability Improvement in NBR

Long chain fatty acids are found in many conventional processing additives. The purpose of this experiment was to test the flowability improvement properties of various fatty acids and other similar compounds when used in a typical NBR injection molding formulation. To that end, the performance characteristics of the following chemicals were evaluated:

Polyplastol™ 15, a commercially available product, believed to comprise wax and organic acid.

Myristic acid, $CH_3-(CH_2)_{12}-COOH$, a fully saturated compound.

Palmitic acid, $CH_3-(CH_2)_{14}-COOH$, a fully saturated compound.

Linoleic acid, $CH_3-(CH_2)_4-CH=CH-CH_2-CH=CH-(CH_2)_7-COOH$, a compound contain double bonds.

Linolenic acid, $CH_3-(CH_2-CH=CH)_3-CH_2-(CH_2)_6-COOH$, a compound containing three double bonds.

Sunproof improved wax, blend of selected hydrocarbon waxes.

The chemical additive used as a reference was 5 phr Polyplastol™ 15, without correction for hardness, and the carbon black used was the commercially available Spheron® 4000 carbon black from Cabot Corporation. Formulations were generated as identified below:

Spheron 4000+5 phr Polyplastol.

Spheron 4000+5 phr extra Plastmoll DOA.

Spheron 4000+0.6×5 phr=3 phr paraffinic wax (60% of polyplastol™ 15=wax).

Spheron 4000+0.4×5 phr=2 phr myristic acid (40% of polyplstol™ 15=myristic acid)

Spheron 4000+0.4×5 phr=2 phr linoleic acid.

Spheron 4000+0.4×5 phr=2 phr linolenic acid.

Spheron 4000+0.4×5 phr=2 phr palmitic acid.

Spheron 4000+0.4×5 phr=2 phr myristic acid+0.6×5 phr=3 phr paraffinic wax (="home made" polyplastol™ 15).

All prepared formulations were tested for Göttfert rheology at 200 degrees Centigrade, without curatives. By contrast, general physicals such as MDR, Mooney, and tensile properties were tested on prepared formulations with curatives.

Samples

Ingredient
SPHERON 4000 RA CSL
STERLING SO PJ-CSL

| | | FORMULATIONS | | | | | | | | | | | |
|---|---|---|---|---|---|---|---|---|---|---|---|---|---|
| Ingredient | stage | R157 | R158 | R159 | R160 | R161 | R162 | R163 | R164 | R165 | R166 | R167 | R168 |
| EUROPRENE N2845 | 1 | 100 | 100 | 100 | 100 | 100 | 100 | 100 | 100 | 100 | 100 | 100 | 100 |
| STEARIC ACID | 1 | 0.5 | 0.5 | 0.5 | 0.5 | 0.5 | 0.5 | 0.5 | 0.5 | 0.5 | 0.5 | 0.5 | 0.5 |
| ZINC OXIDE | 1 | 5 | 5 | 5 | 5 | 5 | 5 | 5 | 5 | 5 | 5 | 5 | 5 |
| SUNPROOF WAX | 1 | 1 | 1 | 4 | 1 | 1 | 1 | 1 | 4 | 1 | 1 | 1 | 1 |
| FLECTOL TMQ | 1 | 3 | 3 | 3 | 3 | 3 | 3 | 3 | 3 | 3 | 3 | 3 | 3 |
| VULCANOX MB | 1 | 0.3 | 0.3 | 0.3 | 0.3 | 0.3 | 0.3 | 0.3 | 0.3 | 0.3 | 0.3 | 0.3 | 0.3 |
| PERMANAX OD | 1 | 3 | 3 | 3 | 3 | 3 | 3 | 3 | 3 | 3 | 3 | 3 | 3 |

-continued

FORMULATIONS

| Ingredient | stage | R157 | R158 | R159 | R160 | R161 | R162 | R163 | R164 | R165 | R166 | R167 | R168 |
|---|---|---|---|---|---|---|---|---|---|---|---|---|---|
| PLASTMOLL DOA | 1 | 5 | 10 | 5 | 5 | 5 | 5 | 5 | 5 | 5 | 5 | 5 | 5 |
| MYRISTIC ACID, 95% | 1 | | | | 2 | | | | 2 | | | | |
| LINOLEIC ACID, 99% | 1 | | | | | 2 | | | | | | | |
| LINOLENIC ACID | 1 | | | | | | 2 | | | | | | |
| PALMITIC ACID | 1 | | | | | | | 2 | | | | | |
| POLYPLASTOL 15 | 1 | 6 | | | | | | | | | 6 | | 6 |
| CB/SPH4000 RA CSL | 1 | 180 | 180 | 180 | 180 | 180 | 180 | 180 | 180 | | | 180 | 180 |
| CB/SSO\PJ-CSL | 1 | | | | | | | | | 110 | 110 | | |
| SANTOGARD PVI | 2 | 0.3 | 0.3 | 0.3 | 0.3 | 0.3 | 0.3 | 0.3 | 0.3 | 0.3 | 0.3 | 0.3 | 0.3 |
| SULFASAN R | 2 | 2 | 2 | 2 | 2 | 2 | 2 | 2 | 2 | 2 | 2 | 2 | 2 |
| THIURAD PELLETS TMTD | 2 | 2 | 2 | 2 | 2 | 2 | 2 | 2 | 2 | 2 | 2 | 2 | 2 |
| SANTOCURE CBS GRS | 2 | 2 | 2 | 2 | 2 | 2 | 2 | 2 | 2 | 2 | 2 | 2 | 2 |

Sample Preparation

Carbon black pellets coated with the compounds listed above were used in the preparation of rubber samples, according to the following procedure. Samples were processed in a Banbury 1570 cc. apparatus, at 75% fill level, at 30° C., with cooling water "on."

| 0' | Add NBR ("acrylonitrile-butadiene rubber") |
| ½' | Add ½ coated carbon black pellets + smalls. |
| 1½' | Add Plastmoll DOA + rest of coated carbon black pellets on top. |
| 2¾' | Sweep. |
| 3½' | Dump, check weight and transfer to mill. |

Mill @ 40° C.

| 0' | Add stage-1 masterbatch. |
| ½' | Add curatives. |
| 1' | x-cut every 15 seconds. |
| 5' | 3 end rolls at 0.2 mm nip setting. |
| 6½' | Band on, obtain grain. |
| 7' | Sheet off at tensile thickness. |

The mix cycle was used twice, the first time to prepare the actual compounds with curatives which was used for all testing except Göttfert Rheology. The second time (day after mixing) the above listed mill cycle was used to prepare Göttfert batches from the leftovers without the addition of the curatives after ½ minute. Between the milling out of the compound leftovers from the previous day, a 5 minute break was used to enable the Mill rolls to cool down.

TESTS PERFORMED

| Test | Number | Parameters |
|---|---|---|
| MDR | CLTC-B1 | 160° C., 1° Arc |
| Mooney Viscosity | CLTC-B3 | ML(1 + 4) @ 100° C. |
| Mooney Viscosity | CLTC-B3 | MS(1 + 4) @ 100° C. |
| Mooney Scorch | CLTC-B3 | 135° C., MS, 1 minute preheat. |
| Gottfert Die Swell | CLTC-B2.03 | @ 200° C., 0.4 mm/sec piston speed. |
| Gottfert Rheology | CLTC-B2.03 | @ 200° C., 0.05–0.80 mm/sec piston speed. |
| Tensile | CLTC-C1.01 | Die C, 23° C. |
| Kontron Tape micro | CLTC-Z1 | 25 (1 × 1 cm) images for quick dispersion check. |

Results

Figure 3:
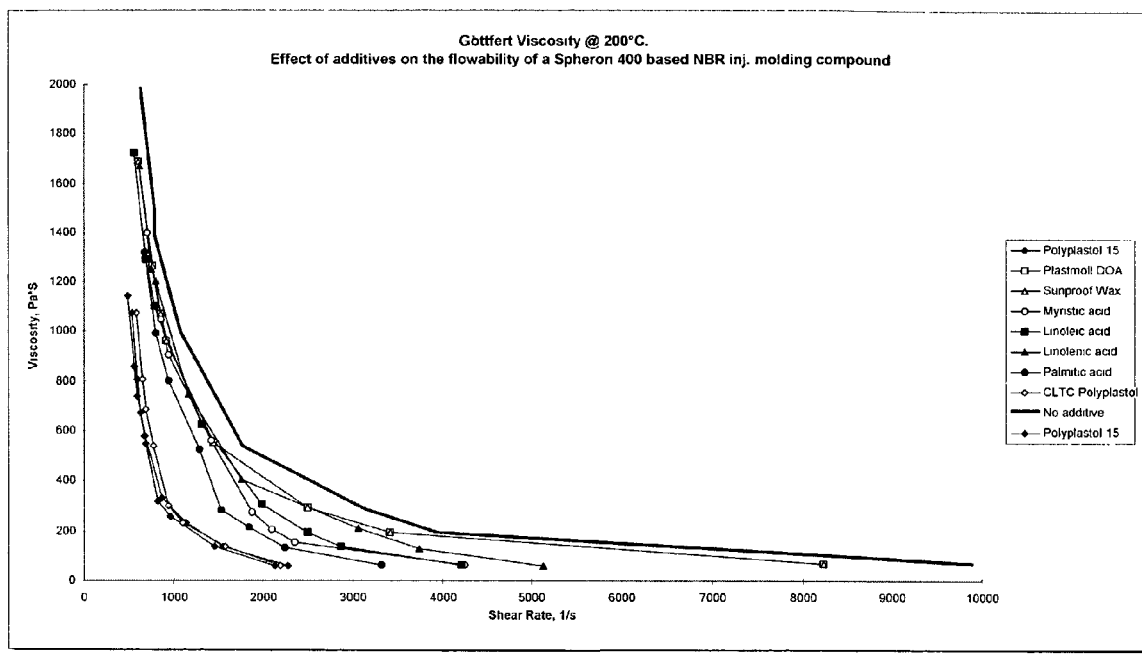
FIG. 3 is a Göttfert viscosity graph at 200 degrees Centigrade showing the effect of additives on the flowability of a Spheron® 4000 carbon black based NBR injection molding compound, where the y-axis represents viscosity.
Figure 4:
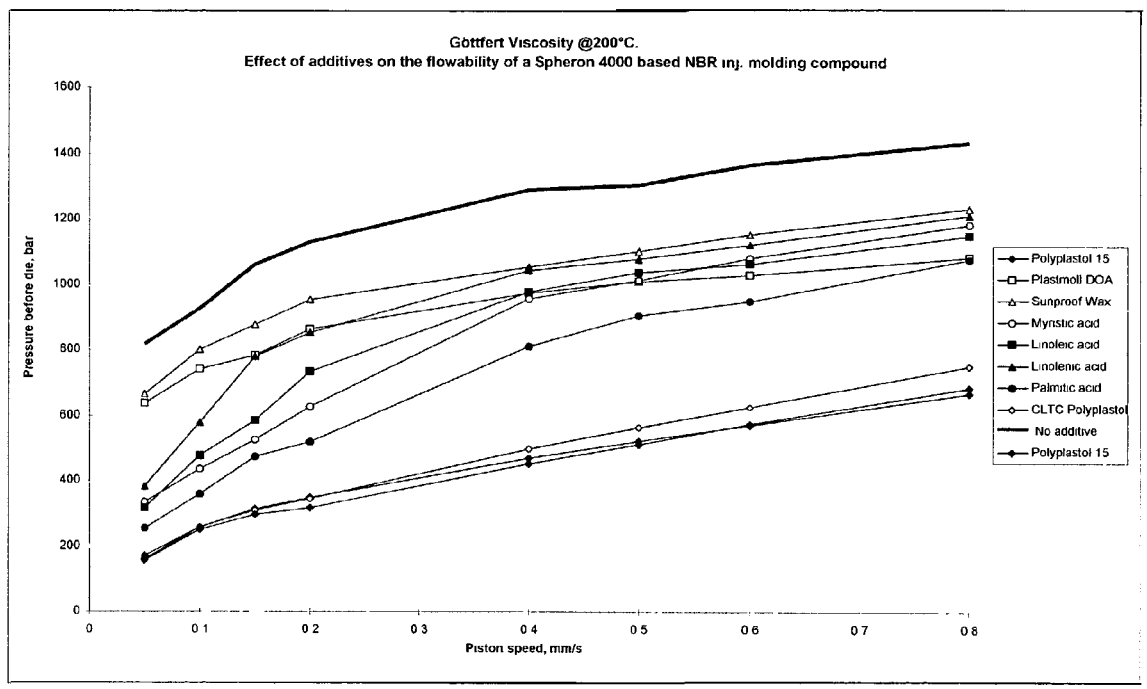
FIG. 4 is another Göttfert viscosity graph at 200 degrees Centigrade showing the effect of additives on the flowability of a Spheron® 4000 carbon black based NBR injection molding compound, where the y-axis represents pressure before the die, in bar.
Figure 5:
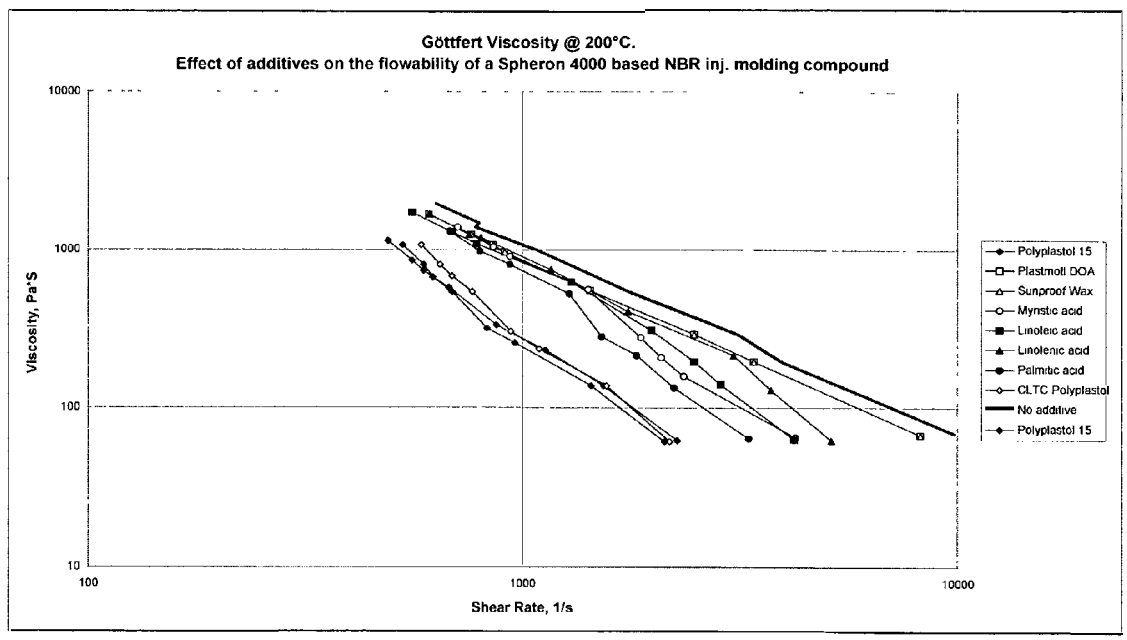
FIG. 5 is another Göttfert viscosity graph at 200 degrees Centigrade showing the effect of additives on the flowability of a Spheron® 4000 carbon black based NBR injection molding compound, where the y-axis is a logarithmic representation of viscosity.
Figure 6:
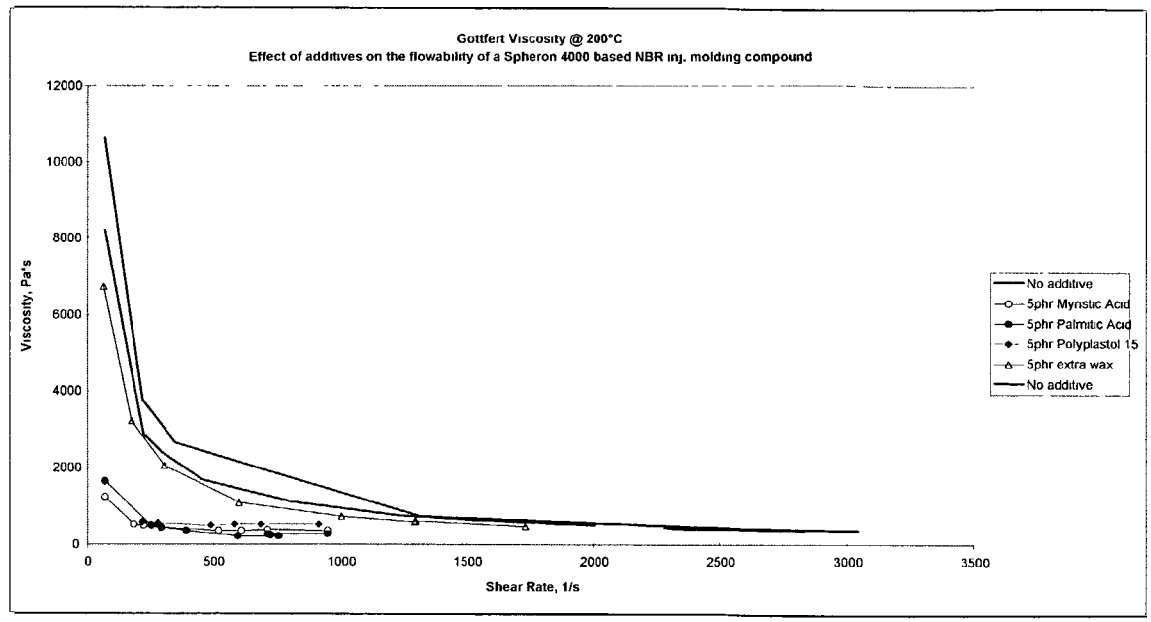
FIG. 6 is a Göttfert viscosity graph at 200 degrees Centigrade showing the effect of additives on the flowability of a Spheron® 4000 carbon black based NBR injection molding compound, where the y-axis represents viscosity.
Figure 7:
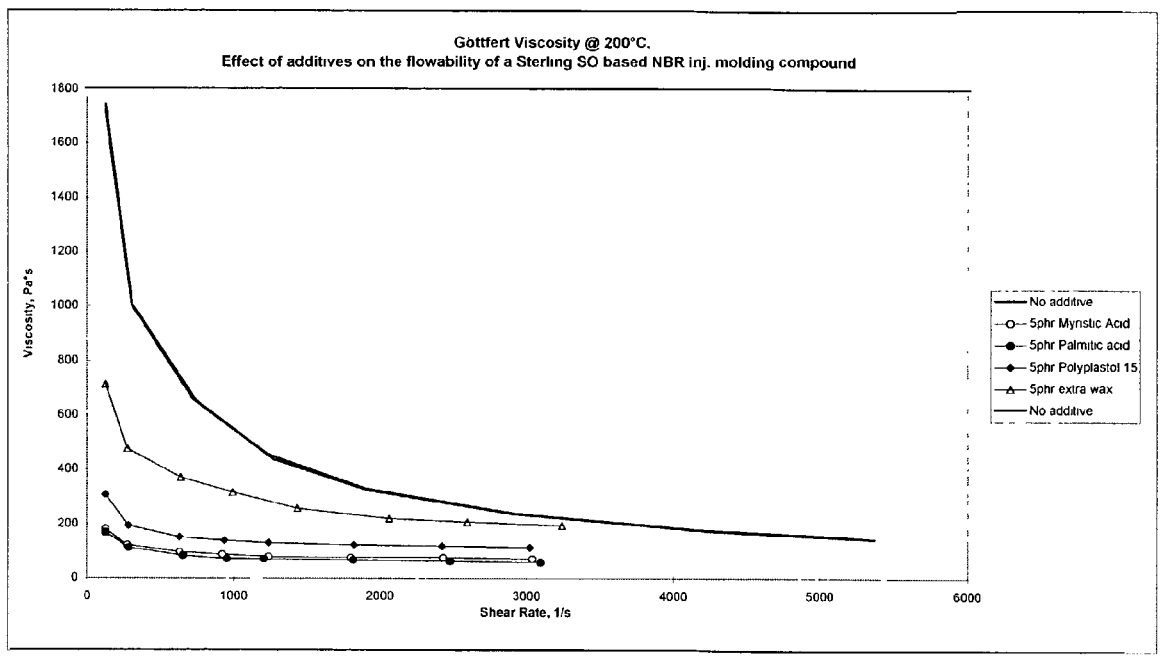
FIG. 7 is a Göttfert viscosity graph at 200 degrees Centigrade showing the effect of additives on the flowability of a Sterling® SO carbon black based NBR injection molding compound, where the y-axis represents viscosity.
Figure 8:
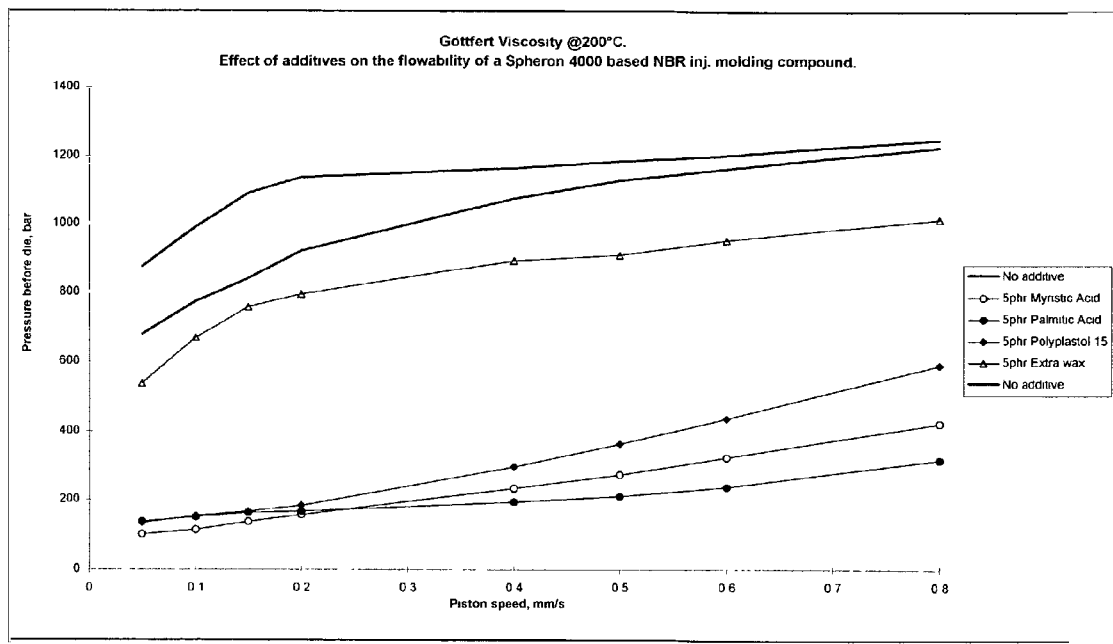
FIG. 8 is another Göttfert viscosity graph at 200 degrees Centigrade showing the effect of additives on the flowability of a Spheron® 4000 carbon black based NBR injection molding compound, where the y-axis represents pressure before the die, in bar.
Figure 9:
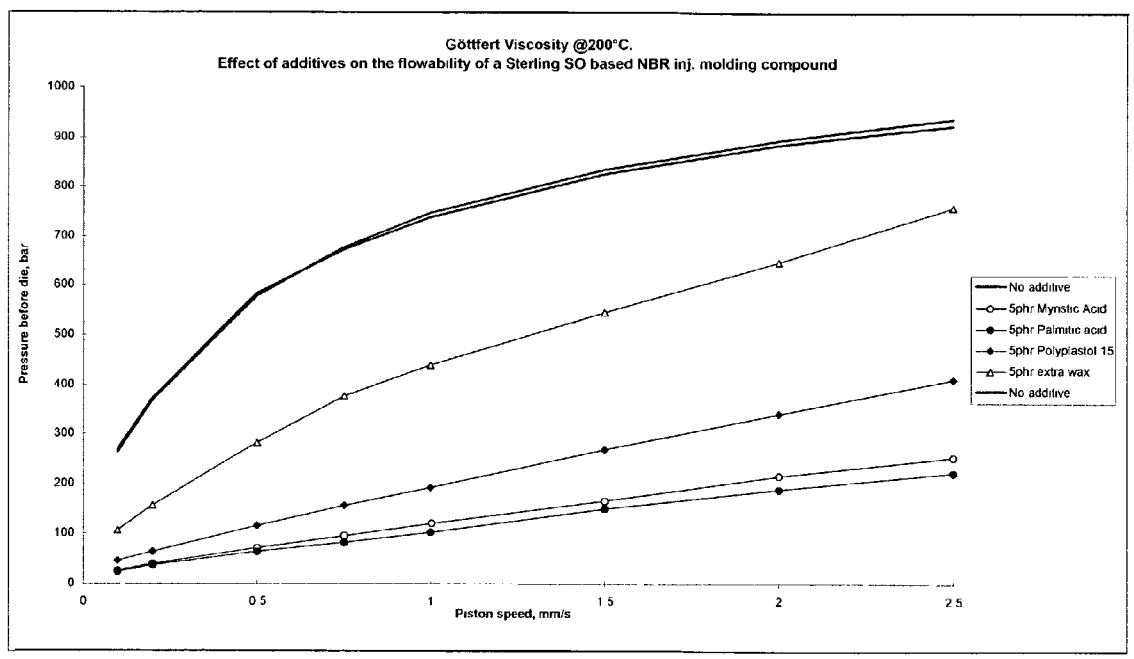
FIG. 9 is another Göttfert viscosity graph at 200 degrees Centigrade showing the effect of additives on the flowability of a Sterling® SO carbon black based NBR injection molding compound, where the y-axis represents pressure before the die, in bar.
Figure 10:
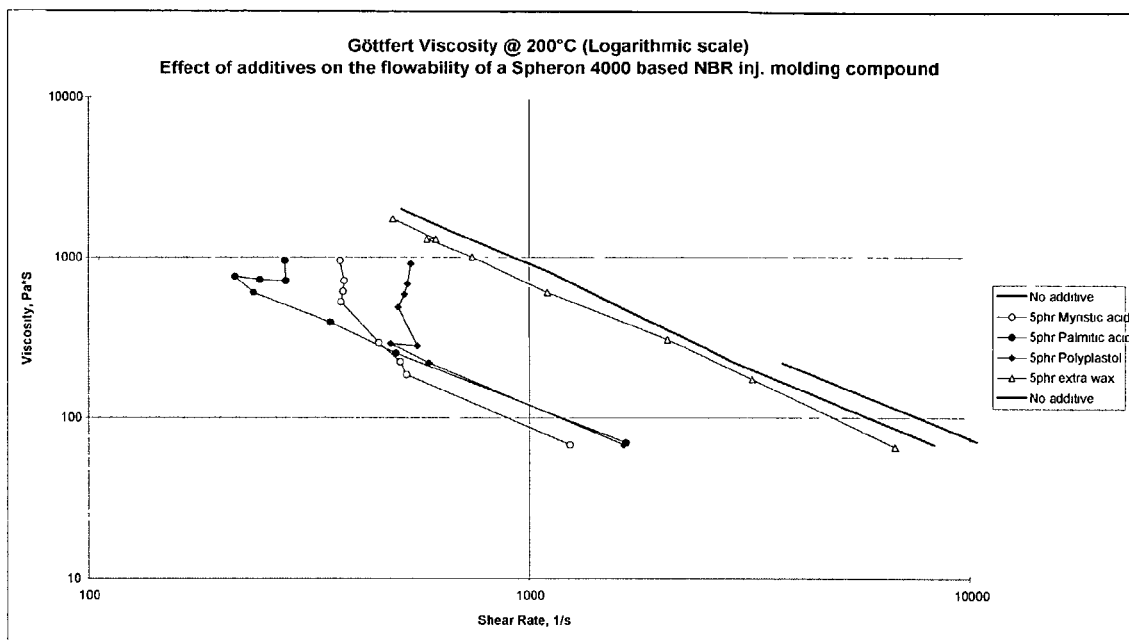
FIG. 10 is a Göttfert viscosity graph at 200 degrees Centigrade showing the effect of additives on the flowability of a Spheron® 4000 carbon black based NBR injection molding compound, where the y-axis is a logarithmic representation of viscosity.
Figure 11:
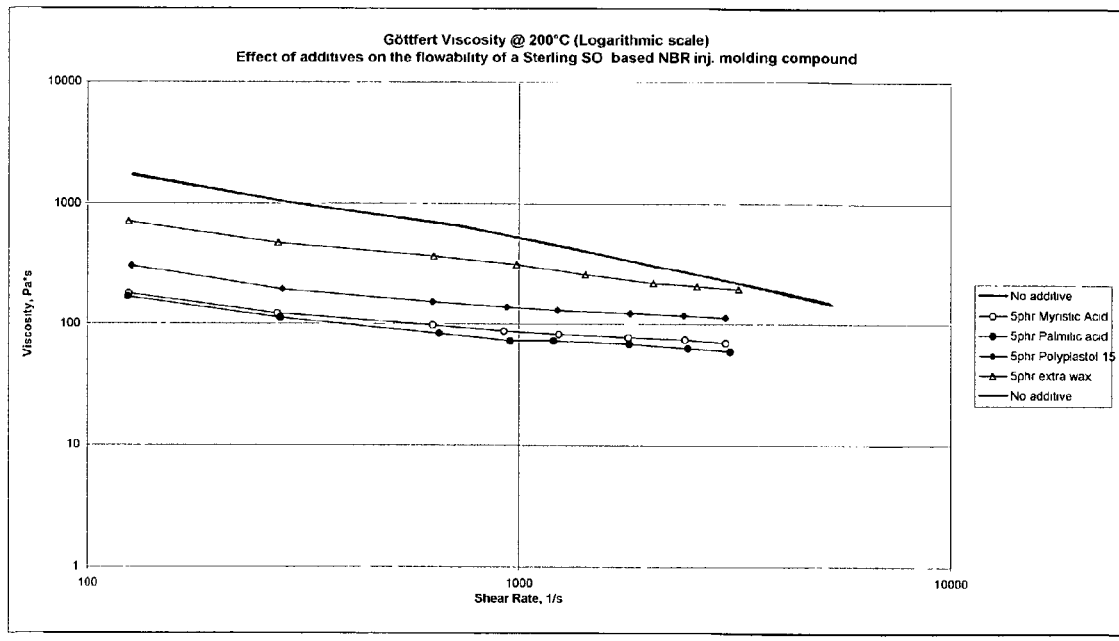
FIG. 11 is another Göttfert viscosity graph at 200 degrees Centigrade showing the effect of additives on the flowability of a Sterling® SO carbon black based NBR injection molding compound, where the y-axis is a logarithmic representation of viscosity.

The results obtained from the described testing are divided in two tables: Table-10 & Table-11. Additionally, three graphs, prepared with the obtained Göttfert data are displayed herein as FIGS. 3–5.

TABLE 10

| Batchnumber | R157 | R158 | R159 | R160 | R161 |
|---|---|---|---|---|---|
| CB Grade | Sph4000 | Sph4000 | Sph4000 | Sph4000 | Sph4000 |
| CB Loading | 180 | 180 | 180 | 180 | 180 |
| Additive | Polyplastol 15 | Plastmoll DOA | Sunproof Wax | Myristic Acid, 95% | Linoleic Acid, 99% |
| Additive loading | 5 phr | 5 phr extra | 3 phr extra wax | 2 phr | 2 phr |
| MDR @ 160° C. | | | | | |
| Min Torque(dNm) | 3.9 | 5.2 | 6.4 | 4.7 | 3.9 |
| Max Torque(dNm) | 49.1 | 56.9 | 57.0 | 58.4 | 49.1 |
| Scorch 1(m.m.) | 1.9 | 1.7 | 1.9 | 1.8 | 1.8 |
| Scorch 3(m.m.) | 2.6 | 2.2 | 2.5 | 2.4 | 2.5 |
| Scorch 5(m.m.) | 3.0 | 2.6 | 2.8 | 2.7 | 2.8 |
| T50(m.m.) | 4.3 | 3.9 | 4.0 | 3.9 | 4.1 |
| T90(m.m.) | 5.7 | 5.5 | 5.7 | 5.4 | 5.6 |
| Mooney viscosity @ 100° C. | | | | | |
| ML (1 + 4)(large rotor) (M.U.) | 120 | 118 | 128 | 145 | 136 |
| MS (1 + 4)(small rotor) (M.U.) | 65 | 62 | 70 | 78 | 75 |

TABLE 10-continued

| Batchnumber | R157 | R158 | R159 | R160 | R161 |
|---|---|---|---|---|---|
| Mooney scorch @ 135° C. | | | | | |
| T3(m.m.) | 8.8 | 8.2 | 8.6 | 7.5 | 8.1 |
| T10(m.m.) | 11.6 | 10.7 | 11.0 | 9.9 | 10.5 |
| T18(m.m.) | 13.1 | 12.2 | 12.3 | 11.4 | 11.9 |
| Tensile properties | | | | | |
| Tensile Strength, (MPa) | 16.1 | 15.8 | 15.9 | 17.5 | 16.1 |
| Elongation @ Break, (%) | 150 | 161 | 156 | 142 | 154 |
| 50% Modulus, (MPa) | 6.7 | 6.2 | 6.9 | 7.9 | 7.0 |
| 100% Modulus, (MPa) | 12.1 | 10.9 | 11.5 | 13.0 | 12.1 |
| 200% Modulus, (MPa) | — | — | — | — | — |
| Göttfert Viscosity @ 200° C. | | | | | |
| Die Swell, @ 0.4 mm/s piston speed, (%) | 31 | 26 | 29 | 26 | 26 |
| Pressure, (bar) | | | | | |
| 0.05 mm/s piston speed | 170 | 636 | 663 | 333 | 316 |
| 0.10 mm/s piston speed | 256 | 742 | 799 | 436 | 475 |
| 0.15 mm/s piston speed | 314 | 784 | 875 | 525 | 584 |
| 0.20 mm/s piston speed | 349 | 864 | 953 | 627 | 733 |
| 0.40 mm/s piston speed | 471 | 975 | 1055 | 955 | 977 |
| 0.50 mm/s piston speed | 523 | 1007 | 1101 | 1011 | 1035 |
| 0.60 mm/s piston speed | 571 | 1029 | 1155 | 1082 | 1066 |
| 0.80 mm/s piston speed | 669 | 1085 | 1234 | 1187 | 1153 |
| Viscosity, (Pa · s) | | | | | |
| 0.05 mm/s piston speed | 2272 | 7801 | 8231 | 4242 | 4210 |
| 0.10 mm/s piston speed | 1544 | 2684 | 3412 | 2346 | 2866 |
| 0.15 mm/s piston speed | 1133 | 2076 | 2492 | 2094 | 2491 |
| 0.20 mm/s piston speed | 873 | 1446 | 1435 | 1878 | 1988 |
| 0.40 mm/s piston speed | 677 | 870 | 913 | 1418 | 1300 |
| 0.50 mm/s piston speed | 592 | 554 | 859 | 938 | 782 |
| 0.60 mm/s piston speed | 555 | 517 | 761 | 859 | 687 |
| 0.80 mm/s piston speed | 488 | 409 | 610 | 707 | 558 |
| Sheer Rate, (1/s) | | | | | |
| 0.05 mm/s piston speed | 62 | 68 | 67 | 65 | 63 |
| 0.10 mm/s piston speed | 138 | 231 | 195 | 157 | 139 |
| 0.15 mm/s piston speed | 232 | 315 | 292 | 209 | 196 |
| 0.20 mm/s piston speed | 333 | 498 | 554 | 278 | 307 |
| 0.40 mm/s piston speed | 579 | 935 | 964 | 561 | 626 |
| 0.50 mm/s piston speed | 738 | 1517 | 1072 | 908 | 1102 |
| 0.60 mm/s piston speed | 858 | 1664 | 1265 | 1050 | 1293 |
| 0.80 mm/s piston speed | 1144 | 2219 | 1687 | 1400 | 1724 |

TABLE 11

| Batchnumber | R162 | R163 | R164 | R167 | R168 |
|---|---|---|---|---|---|
| CB Grade | Sph4000 | Sph4000 | Sph4000 | Sph4000 | Sph4000 |
| CB Loading | 180 | 180 | 180 | 180 | 180 |
| Additive | Linolenic acid 2 phr | Palmitic Acid 2 phr | Myristic Acid/Wax 2 phr/3 phr extra | — | Polyplastol 15 5 phr |
| MDR @ 160° C. | | | | | |
| Min Torque(dNm) | 5.0 | 4.3 | 3.7 | 7.8 | 4.1 |
| Max Torque(dNm) | 59.7 | 56.6 | 47.7 | 69.6 | 51.6 |
| Scorch 1(m.m.) | 1.7 | 1.8 | 1.9 | 1.6 | 2.0 |
| Scorch 3(m.m.) | 2.3 | 2.5 | 2.6 | 2.1 | 2.7 |
| Scorch 5(m.m.) | 2.6 | 2.8 | 3.0 | 2.4 | 3.0 |
| T50(m.m.) | 3.9 | 4.1 | 4.3 | 3.8 | 4.3 |
| T90(m.m.) | 5.5 | 5.9 | 5.7 | 5.6 | 5.7 |
| Mooney viscosity @ 100° C. | | | | | |
| ML (1 + 4)(large rotor) (M.U.) | 145 | 134 | 123 | >200 | 124 |
| MS (1 + 4)(small rotor) (M.U.) | 79 | 73 | 67 | 85 | 70 |

TABLE 11-continued

| Batchnumber | R162 | R163 | R164 | R167 | R168 |
|---|---|---|---|---|---|
| Mooney scorch @ 135° C. | | | | | |
| T3(m.m.) | 7.6 | 8.0 | 8.8 | 7.6 | 8.5 |
| T10(m.m.) | 10.0 | 10.4 | 11.4 | 9.8 | 11.4 |
| T18(m.m.) | 11.4 | 11.9 | 12.8 | 11.0 | 12.9 |
| Tensile properties | | | | | |
| Tensile Strength, (MPa) | 16.7 | 16.4 | 16.3 | 16.8 | 16.4 |
| Elongation @ Break, (%) | 142 | 142 | 154 | 146 | 153 |
| 50% Modulus, (MPa) | 7.5 | 7.0 | 7.1 | 8.1 | 6.9 |
| 100% Modulus, (MPa) | 12.2 | 12.3 | 12.0 | 12.5 | 12.2 |
| 200% Modulus, (MPa) | — | — | — | — | — |
| Göttfert Viscosity @ 200° C. | | | | | |
| Die Swell, @ 0.4 mm/s piston speed, (%) | 25 | 25 | 30 | 27 | 31 |
| Pressure, (bar) | | | | | |
| 0.05 mm/s piston speed | 383 | 253 | 161 | 818 | 156 |
| 0.10 mm/s piston speed | 579 | 358 | 258 | 924 | 250 |
| 0.15 mm/s piston speed | 778 | 473 | 309 | 1062 | 297 |
| 0.20 mm/s piston speed | 852 | 520 | 344 | 1132 | 318 |
| 0.40 mm/s piston speed | 1044 | 811 | 498 | 1289 | 452 |
| 0.50 mm/s piston speed | 1079 | 905 | 565 | 1303 | 513 |
| 0.60 mm/s piston speed | 1125 | 951 | 626 | 1367 | 573 |
| 0.80 mm/s piston speed | 1215 | 1079 | 753 | 1437 | 684 |
| Viscosity, (Pa · s) | | | | | |
| 0.05 mm/s piston speed | 5125 | 3315 | 2188 | 9905 | 2123 |
| 0.10 mm/s piston speed | 3735 | 2234 | 1575 | 3937 | 1446 |
| 0.15 mm/s piston speed | 3054 | 1838 | 1097 | 3129 | 964 |
| 0.20 mm/s piston speed | 1758 | 1528 | 944 | 1765 | 827 |
| 0.40 mm/s piston speed | 1165 | 1280 | 768 | 1080 | 689 |
| 0.50 mm/s piston speed | 800 | 939 | 687 | 780 | 623 |
| 0.60 mm/s piston speed | 755 | 799 | 647 | 792 | 591 |
| 0.80 mm/s piston speed | 612 | 680 | 584 | 628 | 529 |
| Shear Rate, (1/s) | | | | | |
| 0.05 mm/s piston speed | 62 | 64 | 61 | 68 | 61 |
| 0.10 mm/s piston speed | 129 | 133 | 137 | 196 | 138 |
| 0.15 mm/s piston speed | 213 | 214 | 235 | 290 | 259 |
| 0.20 mm/s piston speed | 404 | 284 | 304 | 542 | 321 |
| 0.40 mm/s piston speed | 749 | 528 | 540 | 996 | 547 |
| 0.50 mm/s piston speed | 1204 | 803 | 686 | 1393 | 676 |
| 0.60 mm/s piston speed | 1253 | 992 | 807 | 1494 | 808 |
| 0.80 mm/s piston speed | 1671 | 1323 | 1075 | 1993 | 1077 |

As can be seen from the tables and graphs, all the identified additives improved the processability of the used formulation. Formulation R167 (compound without additive) showed the worst processability by Göttfert and the Mooney viscosity data.

Three formulations showed clearly better Göttfert figures: the first two were the formulations containing 5 phr of Polyplastol™ 15; the third formulation was one containing a compound similar to Polyplastol in composition, ("Polystastol").

A logarithmic plot of the viscosity vs. shear rate (FIG. 5) showed that the additives can be divided in three groups:
1. The wax/acid blends which showed the largest extrusion improvement.
2. The "acid group" showed a clear improvement but not as large as the wax/acid blends. From a certain point all included "acid" additives showed a bending in their curve. (see FIG. 5).
3. The wax and plasticiser group which showed the same straight line as the base formulation without additive only at a lower level.

25 cm² of extruded tape were prepared for a quick dispersion check. Prepared tapes were visually compared with each other and no differences in dispersion level between the compounds were observed.

All included additives improved the processability of the used formulation. The formulations exhibiting superior Göttfert data were those containing Polyplastol™ 15 or the "Polystastol." The addition of 5 phr extra Plastmoll DOA resulted in a similar Mooney viscosity level as the Polyplastol™ 15 type compounds, but this data was not confirmed by the Göttfert viscosity results. No differences in dispersion level between the compounds were observed. These results show that additives can be used to both confer improved physical properties on the carbon black pellets, as well as improve the processing of rubber or elastomeric compositions.

Example 4

Flowability Improvement

Example 3 indicated that the formulations giving the best results were those containing Polyplastol™ 15. Since only 2 or 3 phr of most additives were used vs. Polyplastol™ 15 at the 5 phr level, a fourth experiment investigated the performance of various additives when used at the same loading level. A selection from the additives used in Example 3 were mixed and tested in two different formulations as alternatives to the commercially available processing aid Polyplastol™ 15.

In this example, Plastmoll DOA plasticizer, Sunproof improved wax and various fatty acids were evaluated for their flowability and processibility characteristics against Polyplastol™ 15. Additionally, other compounds were included to investigate the influence of the individual components of Polyplastol™ 15 and various other fatty acids at the same loading level. All components were compared against the same or comparable level present in Polyplastol™ 15, e.g.:

Polyplastol™ 15=60% wax⇒ comparison of 3 phr wax vs. 5 phr Polyplastol™ 15.

Polyplastol™ 15=40% myristic acid⇒ comparison of 2 phr myristic acid vs 5 phr Polyplastol™ 15, same loading level was used for other included fatty acids.

Comparison of 5 phr Polyplastol™ 15 vs 5 phr Plastmoll DOA plasticizer.

The carbon black used in the present example was the commercially available Spheron® 4000 carbon black and Sterling® SO carbon black. Two formulations were evaluated as set forth below.

Based on Spheron® 4000:
Spheron 4000+no additive (mixed in duplicate).
Spheron 4000+5 phr Polyplastol™ 15.
Spheron 4000+5 phr paraffinic wax.
Spheron 4000+5 phr myristic acid.
Spheron 4000+5 phr palmitic acid.

Based on Sterling® SO:
Sterling SO+no additive (mixed in duplicate).
Sterling SO+5 phr Polyplastol™ 15.
Sterling SO+5 phr paraffinic wax.
Sterling SO+5 phr myristic acid.
Sterling SO+5 phr palmitic acid.

Data obtained on these formulations are reported below:

Samples

Ingredient
SPHERON® 4000 RA CSL
STERLING® SO PJ-CSL

| FORMULATIONS | | | | | | | |
|---|---|---|---|---|---|---|---|
| Ingredient | stage | R679 | R680 | R681 | R682 | R683 | R684 |
| EUROPRENE N2845 | 1 | 100 | 100 | 100 | 100 | 100 | 100 |
| STEARIC ACID | 1 | 0.5 | 0.5 | 0.5 | 0.5 | 0.5 | 0.5 |
| ZINC OXIDE | 1 | 5 | 5 | 5 | 5 | 5 | 5 |
| SUNPROOF WAX | 1 | 1 | 1 | 1 | 1 | 6 | 1 |
| FLECTOL TMQ | 1 | 3 | 3 | 3 | 3 | 3 | 3 |
| VULCANOX MB | 1 | 0.3 | 0.3 | 0.3 | 0.3 | 0.3 | 0.3 |
| PERMANAX OD | 1 | 3 | 3 | 3 | 3 | 3 | 3 |
| PLASTMOLL DOA | 1 | 5 | 5 | 5 | 5 | 5 | 5 |
| MYRISTIC ACID, 95% | 1 | | 5 | | | | |
| PALMITIC ACID | 1 | | | 5 | | | |
| POLYPLASTOL 15 | 1 | | | | 5 | | |
| SPHERON 4000 RA CSL | 1 | 180 | 180 | 180 | 180 | 180 | 180 |
| SANTOGARD PVI | 2 | 0.3 | 0.3 | 0.3 | 0.3 | 0.3 | 0.3 |
| SULFASAN R | 2 | 2 | 2 | 2 | 2 | 2 | 2 |
| THIURAD PELLETS TMTD | 2 | 2 | 2 | 2 | 2 | 2 | 2 |
| SANTOCURE CBS GRS | 2 | 2 | 2 | 2 | 2 | 2 | 2 |

-continued

| FORMULATIONS | | | | | | | |
|---|---|---|---|---|---|---|---|
| Ingredient | stage | R685 | R686 | R687 | R688 | R689 | R690 |
| EUROPRENE N2845 | 1 | 100 | 100 | 100 | 100 | 100 | 100 |
| STEARIC ACID | 1 | 0.5 | 0.5 | 0.5 | 0.5 | 0.5 | 0.5 |
| ZINC OXIDE | 1 | 5 | 5 | 5 | 5 | 5 | 5 |
| SUNPROOF WAX | 1 | 1 | 1 | 1 | 1 | 6 | 1 |
| FLECTOL TMQ | 1 | 3 | 3 | 3 | 3 | 3 | 3 |
| VULCANOX MB | 1 | 0.3 | 0.3 | 0.3 | 0.3 | 0.3 | 0.3 |
| PERMANAX OD | 1 | 3 | 3 | 3 | 3 | 3 | 3 |
| PLASTMOLL DOA | 1 | 5 | 5 | 5 | 5 | 5 | 5 |
| MYRISTIC ACID, 95% | 1 | | 5 | | | | |
| PALMITIC ACID | 1 | | | 5 | | | |
| POLYPLASTOL 15 | 1 | | | | 5 | | |
| STERLING SO PJ-CSL | 1 | 55 | 55 | 55 | 55 | 55 | 55 |
| SANTOGARD PVI | 2 | | | | | | |
| SULFASAN R | 2 | 2 | 2 | 2 | 2 | 2 | 2 |
| THIURAD PELLETS TMTD | 2 | 2 | 2 | 2 | 2 | 2 | 2 |
| SANTOCURE CBS GRS | 2 | 2 | 2 | 2 | 2 | 2 | 2 |

Sample Preparation

Carbon black pellets coated with the compounds listed above were used in the preparation of rubber samples, according to the procedure used in Example 3 above.

| TESTS PERFORMED | | |
|---|---|---|
| Test | Number | Parameters |
| MDR | CLTC-B1 | 160° C., 1° Arc |
| Mooney Viscosity | CLTC-B3 | ML(1 + 4) @ 100° C./ML(2 + 3) @ 100° C. for R679. |
| Mooney Viscosity | CLTC-B3 | MS(1 + 4) @ 100° C. |
| Mooney Scorch | CLTC-B3 | 135° C., MS, 1 minute preheat |
| Tensile | CLTC-C1.01 | Die C, 23° C. |
| Hardness Shore A | CLTC-C3.01 | |
| Gottfert Die Swell | CLTC-B2.03 | @ 200° C., 0.4 mm/sec piston speed only for Gapi-90 compounds. |
| Gottfert Rheology | CLTC-B2.03 | @ 200° C., 0.05–0.80 mm/sec piston speed for Gapi-90 compounds @ 200° C., 0.10–2.50 mm/sec piston speed for Gapi-70 compounds |

Cure Times Used for Sample Preparation

Gapi-90: Sheets 8½' @ 160° C. & Hardness blocks 11' @ 160° C. (same conditions as for SR98 161)

Gapi-70: Sheets 10' @160° C. & Hardness blocks 12½' @ 160° C.

Test Results

The results obtained from the described testing are divided in two tables: Table-12 & Table-13. Additionally, six graphs, prepared with the obtained Göttfert data are displayed herein as FIGS. 6–11.

TABLE 12

| Batch number | R679 | R680 | R681 | R682 | R683 | R684 |
|---|---|---|---|---|---|---|
| CB Grade | Sph4000 | Sph4000 | Sph4000 | Sph4000 | Sph4000 | Sph4000 |
| CB Loading | 180 | 180 | 180 | 180 | 180 | 180 |
| Additive | — | Myristic Acid | Palmitic Acid | Polyplastol 15 | Sunproof Wax | — |
| Additive loading | | 5 phr | 5 phr | 5 phr | 5 phr | |
| MDR @ 160° C. | | | | | | |
| Min Torque(dNm) | 7.1 | 4.5 | 3.9 | 4.1 | 4.3 | 7.0 |
| Max Torque(dNm) | 52.9 | 36.7 | 35.5 | 33.5 | 32.2 | 48.7 |
| Scorch 1(m.m.) | 1.7 | 2.0 | 2.0 | 2.3 | 2.3 | 1.8 |
| Scorch 3(m.m.) | 2.2 | 2.6 | 2.7 | 2.9 | 2.9 | 2.3 |
| Scorch 5(m.m.) | 2.5 | 2.9 | 3.0 | 3.3 | 3.3 | 2.6 |
| T50(m.m.) | 3.7 | 3.9 | 4.0 | 4.2 | 4.1 | 3.9 |
| T90(m.m.) | 6.0 | 5.9 | 6.1 | 6.1 | 5.7 | 6.7 |
| Mooney Viscosity @ 100° C. | | | | | | |
| ML (1 + 4)(M.U.) | stopped* | 114 | 120 | 113 | 112 | 139 |
| ML (2 + 3)(M.U.) | 145 | — | — | — | — | — |
| MS (1 + 4)(M.U.) | 76 | 61 | 64 | 61 | 60 | 75 |
| Mooney scorch @ 135° C. | | | | | | |
| T3(m.m.) | 8.8 | 8.5 | 8.7 | 10.0 | 10.6 | 8.8 |
| T10(m.m.) | 11.1 | 11.0 | 11.4 | 12.8 | 13.4 | 11.5 |
| T18(m.m.) | 12.3 | 12.5 | 12.9 | 14.2 | 14.7 | 12.7 |
| Tensile properties | | | | | | |
| Tensile Strength, (MPa) | 15.7 | 14.9 | 15.3 | 15.0 | 15.5 | 15.7 |
| Elongation @ Break, (%) | 145 | 142 | 143 | 163 | 173 | 157 |
| 50% Modulus, (MPa) | 7.2 | 6.7 | 7.2 | 6.3 | 6.1 | 7.3 |
| 100% Modulus, (MPa) | 11.5 | 11.3 | 11.3 | 10.4 | 10.7 | 11.2 |
| 200% Modulus, (MPa) | — | — | — | — | — | — |
| Hardness | | | | | | |
| Maximum | 91 | 92 | 92 | 91 | 91 | 91 |
| 3 seconds | 89 | 90 | 90 | 89 | 89 | 89 |
| IRHD | 90 | 90 | 90 | 90 | 90 | 90 |
| Göttfert Viscosity @ 200° C. | | | | | | |
| Die Swell @ 0.4 mm/s piston speed | 22 | 32 | 28 | 34 | 28 | 23 |
| Pressure, (bar) | | | | | | |
| 0.05 mm/s piston speed | 877 | 103 | 139 | 134 | 538 | 677 |
| 0.10 mm/s piston speed | 992 | 116 | 150 | 155 | 669 | 773 |
| 0.15 mm/s piston speed | 1090 | 137 | 165 | 168 | 759 | 839 |
| 0.20 mm/s piston speed | 1138 | 159 | 168 | 186 | 793 | 922 |
| 0.40 mm/s piston speed | 1163 | 234 | 194 | 295 | 893 | 1075 |
| 0.50 mm/s piston speed | 1183 | 275 | 210 | 364 | 910 | 1125 |
| 0.60 mm/s piston speed | 1198 | 324 | 238 | 435 | 953 | 1159 |
| 0.80 mm/s piston speed | 1247 | 421 | 316 | 590 | 1016 | 1227 |
| Viscosity, (Pa · s) | | | | | | |
| 0.05 mm/s piston speed | 10635 | 1242 | 1656 | 1641 | 6754 | 8243 |
| 0.10 mm/s piston speed | 3754 | 527 | 497 | 593 | 3202 | 2870 |
| 0.15 mm/s piston speed | 2629 | 510 | 353 | 485 | 2062 | 2384 |
| 0.20 mm/s piston speed | 721 | 455 | 237 | 557 | 1102 | 1689 |
| 0.40 mm/s piston speed | 372 | 374 | 215 | 503 | 740 | 1115 |
| 0.50 mm/s piston speed | 425 | 377 | 245 | 521 | 586 | 772 |
| 0.60 mm/s piston speed | 460 | 380 | 280 | 529 | 612 | 642 |
| 0.80 mm/s piston speed | 360 | 371 | 278 | 539 | 489 | 511 |
| Shear Rate, (1/s) | | | | | | |
| 0.05 mm/s piston speed | 69 | 68 | 70 | 68 | 66 | 68 |
| 0.10 mm/s piston speed | 220 | 184 | 252 | 218 | 175 | 225 |
| 0.15 mm/s piston speed | 347 | 223 | 390 | 290 | 307 | 295 |
| 0.20 mm/s piston speed | 1317 | 292 | 599 | 279 | 600 | 456 |
| 0.40 mm/s piston speed | 2836 | 521 | 757 | 489 | 1006 | 804 |
| 0.50 mm/s piston speed | 2321 | 609 | 725 | 583 | 1294 | 1226 |

TABLE 12-continued

| Batch number | R679 | R680 | R681 | R682 | R683 | R684 |
|---|---|---|---|---|---|---|
| 0.60 mm/s piston speed | 2284 | 711 | 711 | 686 | 1298 | 1504 |
| 0.80 mm/s piston speed | 3046 | 948 | 949 | 914 | 1731 | 2005 |

*see experimental/Discussion.

TABLE 13

| Batch number | R686 | R686 | R687 | R688 | R689 | R690 |
|---|---|---|---|---|---|---|
| CB Sample Number | 98.4261 | 98.4261 | 98.4261 | 98.4261 | 98.4261 | 98.4261 |
| CB Grade | SterlingSO | SterlingSO | SterlingSO | SterlingSO | SterlingSO | SterlingSO |
| CB Loading | 55 | 55 | 55 | 55 | 55 | 55 |
| Additive | — | Myristic Acid | Palmitic Acid | Polyplastol 15 | Sunproof Wax | — |
| Additive loading | | 5 phr | 5 phr | 5 phr | 5 phr | |
| MDR @ 160° C. | | | | | | |
| Min Torque(dNm) | 1.9 | 1.1 | 1.1 | 1.4 | 1.5 | 2.0 |
| Max Torque(dNm) | 31.8 | 20.5 | 20.3 | 19.6 | 17.7 | 32.1 |
| Scorch 1(m.m.) | 2.6 | 2.8 | 2.8 | 3.2 | 3.1 | 2.6 |
| Scorch 3(m.m.) | 3.3 | 3.6 | 3.6 | 3.9 | 3.8 | 3.3 |
| Scorch 5(m.m.) | 3.6 | 3.9 | 4.0 | 4.3 | 4.2 | 3.6 |
| T50(m.m.) | 4.7 | 4.6 | 4.7 | 4.9 | 4.8 | 4.7 |
| T90(m.m.) | 7.4 | 7 | 7.3 | 7.1 | 6.4 | 7.4 |
| Mooney Viscosity @ 100° C. | | | | | | |
| ML (1 + 4)(M.U.) | 49 | 39 | 38 | 42 | 41 | 49 |
| MS (1 + 4)(M.U.) | 26 | 21 | 20 | 23 | 22 | 26 |
| Mooney scorch @ 135° C. | | | | | | |
| T3(m.m.) | 14.1 | 12.3 | 12.5 | 15.0 | 15.4 | 14.5 |
| T10(m.m.) | 18.1 | 16.1 | 16.4 | 19.1 | 19.6 | 18.4 |
| T18(m.m.) | 19.8 | 18.3 | 18.6 | 21.1 | 21.4 | 20.1 |
| Tensile properties | | | | | | |
| Tensile Strength, (MPa) | 18.2 | 16.7 | 17.0 | 16.6 | 16.0 | 17.9 |
| Elongation @ Break, (%) | 415 | 380 | 398 | 408 | 456 | 402 |
| 50% Modulus, (MPa) | 1.9 | 2.0 | 2.0 | 1.7 | 1.6 | 1.9 |
| 100% Modulus, (MPa) | 4.0 | 3.9 | 3.9 | 3.4 | 3.0 | 4.0 |
| 200% Modulus, (MPa) | 9.2 | 9.1 | 8.9 | 8.0 | 7.3 | 9.3 |
| 300% Modulus, (MPa) | 14.2 | 13.9 | 13.5 | 12.3 | 11.4 | 14.2 |
| Hardness | | | | | | |
| Maximum | 68 | 71 | 71 | 68 | 67 | 68 |
| 3 seconds | 65 | 68 | 68 | 65 | 64 | 65 |
| IRHD | 66 | 69 | 69 | 67 | 68 | 66 |
| Göttfert Viscosity @ 200° C. | | | | | | |
| Pressure (bar) | | | | | | |
| 0.10 mm/s piston speed | 268 | 27 | 25 | 47 | 107 | 264 |
| 0.20 mm/s piston speed | 373 | 40 | 38 | 66 | 158 | 370 |
| 0.50 mm/s piston speed | 583 | 72 | 65 | 116 | 283 | 579 |
| 0.75 mm/s piston speed | 672 | 97 | 84 | 157 | 377 | 678 |
| 1.0 mm/s piston speed | 738 | 122 | 104 | 193 | 440 | 746 |
| 1.5 mm/s piston speed | 825 | 166 | 150 | 268 | 544 | 834 |
| 2.0 mm/s piston speed | 884 | 216 | 188 | 340 | 645 | 893 |
| 2.5 mm/s piston speed | 924 | 254 | 222 | 410 | 757 | 937 |
| Viscosity (Pa · s) | | | | | | |
| 0.10 mm/s piston speed | 1746 | 180 | 167 | 309 | 713 | 1723 |
| 0.20 mm/s piston speed | 1005 | 121 | 112 | 194 | 476 | 1001 |
| 0.50 mm/s piston speed | 655 | 98 | 83 | 152 | 370 | 661 |
| 0.75 mm/s piston speed | 439 | 87 | 73 | 139 | 316 | 458 |
| 1.0 mm/s piston speed | 324 | 82 | 72 | 130 | 256 | 328 |
| 1.5 mm/s piston speed | 236 | 77 | 69 | 123 | 220 | 238 |
| 2.0 mm/s piston speed | 172 | 74 | 63 | 117 | 207 | 177 |
| 2.5 mm/s piston speed | 144 | 70 | 60 | 113 | 194 | 148 |
| Shear Rate (1/s) | | | | | | |
| 0.10 mm/s piston speed | 128 | 125 | 124 | 127 | 125 | 127 |
| 0.20 mm/s piston speed | 310 | 277 | 281 | 285 | 278 | 308 |
| 0.50 mm/s piston speed | 742 | 633 | 654 | 634 | 637 | 730 |
| 0.75 mm/s piston speed | 1274 | 927 | 958 | 942 | 994 | 1233 |
| 1.0 mm/s piston speed | 1900 | 1242 | 1209 | 1238 | 1434 | 1899 |
| 1.5 mm/s piston speed | 2915 | 1802 | 1812 | 1820 | 2061 | 2925 |

TABLE 13-continued

| Batch number | R686 | R686 | R687 | R688 | R689 | R690 |
|---|---|---|---|---|---|---|
| 2.0 mm/s piston speed | 4295 | 2434 | 2477 | 2421 | 2599 | 4214 |
| 2.5 mm/s piston speed | 5369 | 3042 | 3096 | 3027 | 3248 | 5268 |

As can be seen from the tables and graphs, all included additives improved the processability of the used formulations. However, the obtained viscosity test results (Mooney and Göttfert) for this study were significantly lower compared to the ones obtained in Example 1. The differences were probably caused by the fact that a new bale of Europrene N2845 NBR was used for this experiment.

Myristic acid and Palmitic acid, used at the some loading level as Polyplastol™ 15 clearly showed better flowability and processability characteristic compared to the commercially available product. This surprising observation was noted in both formulations. Differences between both fatty acids and Polyplastol™ 15 were especially clear at the higher piston speeds/shear rates that typical of injection molding. The loading level used in this experiments (5 phr) did not show a negative influence on tensile or cure properties.

These two experiments confirm that the identified additives can serve a variety of purposes in carbon black technology. When additives are used according to the present invention, carbon black pellets can be generated that offer a variety of improved properties such as attrition resistance, superior handling characteristics, and improved dispersibility. Additionally, the coating can be used chosen to confer desirable properties on the elastomeric compositions that use the pelletized carbon blacks as starting materials. As can be seen from the two examples, coated carbon black pellets of the present invention can be processed into elastomeric formulations that offer improved Göttfert viscosity properties. Improved viscosity results in improved flowability during forming operations and minimizes mold fouling, properties that are highly desirable in the context of injection molding of rubber or elastomeric compositions.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims and equivalents thereof.

What is claimed is:

1. A coated carbon black pellet comprising a pre-formed carbon black pellet coated with a coating agent, said coating agent having the following characteristics:
   a) a melting point of at least 25° C.; and
   b) when molten, wets the carbon black pellet; and
   wherein said coated carbon black pellet comprises a pellet size of 0.125 to 2.0 mm.

2. The coated carbon black pellet of claim 1, wherein said coating agent further has the following characteristics:
   c) when molten and at the coating temperature employed to form the coated pellet, exhibits less than 5% decomposition or degradation; or
   d) when molten and at the coating temperature employed to form the coated pellet, exhibits a viscosity below 2 Pa·s at a shear rate of 10 s$^{-1}$; or both.

3. The coated carbon black pellet of claim 1, wherein the melting point of said coating agent exceeds 45° C.

4. The coated carbon black pellet of claim 1, wherein the coating agent comprises fatty acid, fatty acid ester, wax, wax with a plasticizer, or a combination thereof.

5. The coated carbon black pellet of claim 1, wherein said coating agent comprises fatty acid or a wax thereof, or a combination thereof.

6. The coated carbon black pellet of claim 1, wherein said coating agent comprises fatty acid of the formula $CH_3$—$(CH_2)_n$—COOH, where n is an integer from 10 to 20, or a wax thereof, or a combination thereof.

7. The coated carbon black pellet of claim 1, wherein said coating agent comprises myristic acid, linoleic acid, linolenic acid, palmitic acid, or a combination thereof.

8. The coated carbon black pellet of claim 1, wherein said coating agent comprises myristic acid, or palmitic acid, or a combination thereof.

9. The coated carbon black pellet of claim 1, wherein said coating agent comprises myristic acid.

10. The coated carbon black pellet of claim 1, wherein said coating agent comprises palmitic acid.

11. The coated carbon black pellet of claim 1, comprising from about 0.10% by weight or less to about 25% by weight of said coating agent.

12. The coated carbon black pellet of claim 1, comprising from about 1% by weight to about 5% by weight of said coating agent.

13. The coated carbon black pellet of claim 1, wherein said coating agent is at least one of a non-polymeric organic compound, an organic thermoplastic homopolymer, an organic thermoplastic copolymer, or a wax.

14. The coated carbon black pellet of claim 1, wherein said coating agent comprises pentaerythritol tetrastearate or a derivative thereof.

15. The coated carbon black pellet of claim 1, wherein said coating agent comprises a polyethylene wax.

16. A masterbatch or concentrate comprising a plurality of the coated carbon black pellets of claim 1.

17. A method for preparing a coated carbon black pellet comprising forming a carbon black pellet and coating said pellet on its outer surface with a coating agent, said coating agent having the following characteristics:
   a) a melting point of at least 25° C.; and
   b) when molten, wets the carbon black pellet,
   wherein the coated carbon black pellet is more attrition resistant, has increased dispersibility, has lower viscosity, and has increased flow properties compared to a non-coated carbon black pellet; and
   wherein said coated carbon black pellet comprises a pellet size of 0.125 to 2.0 mm.

18. The method of claim 17, wherein said coating agent further has the following characteristics:
   c) when molten and at the coating temperature employed, exhibits less than 5% decomposition or degradation; or
   d) when molten and at the coating temperature employed, exhibits a viscosity below 2 Pa·s at a shear rate of 10 s$^{-1}$; or both.

19. The method of claim 17 wherein the melting point of said coating agent exceeds 45° C.

20. The method of claim 17, wherein said coating agent comprises a fatty acid, a fatty acid ester, a wax, a wax with a plasticizer, or a combination thereof.

21. The method of claim 17, wherein said coating agent comprises a fatty acid, a wax, or a combination thereof.

22. The method of claim 17, wherein said coating agent comprises pentaerythritol tetrastearate or a derivative thereof.

23. The method of claim 17, wherein said coating agent comprises a fatty acid of the formula $CH_3—(CH_2)_n—COOH$, where n is an integer from 10 to 20, a wax, or a combination thereof.

24. The method of claim 17, wherein said coating agent comprises myristic acid, linoleic acid, linolenic acid, palmitic acid, or a combination thereof.

25. The method of claim 17, wherein said coating agent comprises myristic acid, palmitic acid, or a combination thereof.

26. The method of claim 17, wherein said coating agent comprises myristic acid.

27. The method of claim 17, wherein said coating agent comprises palmitic acid.

28. The method of claim 17, wherein said coated carbon black pellet comprises from about 0.10% or less by weight to about 25% by weight of said coating agent.

29. The method of claim 17, wherein said coated carbon black pellet comprises from about 1% by weight to about 5% by weight of said coating agent.

30. The method of claim 17, wherein said carbon black pellet is at a temperature above the melting point of said coating agent at the time when said pellet is coated with said coating agent.

31. The method of claim 17, wherein said coating agent is at least one of a non-polymeric organic compound, an organic thermoplastic homopolymer, an organic thermoplastic copolymer, or a wax.

32. A method for producing a coated carbon black pellet comprising:
   providing a carbon black pellet;
   at least partially coating the outer surface of said pellet with a molten composition; and
   solidifying said molten composition,
   wherein the coated carbon black pellet is more attrition resistant, has increased dispersibility, has lower viscosity, and has increased flow properties compared to a non-coated carbon black pellet; and
   wherein said coated carbon black pellet comprises a pellet size of 0.125 to 2.0 mm.

33. The method of claim 32, wherein said step of providing a carbon black pellet comprises forming a carbon black pellet in a pelletizer.

34. The method of claim 33, wherein said pelletizer is a pin-pelletizer.

35. The method of claim 32, wherein said molten composition comprises myristic acid, or palmitic acid, or a combination thereof.

36. The method of claim 32, wherein said method comprises heating a composition to provide said molten composition.

37. The method of claim 32, wherein said coated carbon black pellet comprises from about 0.10% or less by weight to about 25% by weight of said molten composition based on the total weight of said coated carbon black pellet.

38. The method of claim 32, wherein said coated carbon black pellet comprises from about 1% by weight to about 5% by weight of said molten composition based on the total weight of said coated carbon black pellet.

39. The method of claim 32, wherein said at least partially coating comprises spraying said molten composition onto said carbon black pellets.

40. The method of claim 32, wherein said carbon black pellet comprises a pin-pelletized carbon black pellet.

41. The method of claim 32, wherein said carbon black pellet is at a temperature above the melting point of said composition at the time when said pellet is coated with said composition.

42. The method of claim 32, wherein said molten composition comprises a polyethylene wax.

43. A flowable composition comprising a plurality of coated carbon black pellets produced by the method of claim 32.

44. A coated carbon black pellet comprising a carbon black pellet at least partially coated with myristic acid, or palmitic acid, or a combination thereof.

45. The coated carbon black pellet of claim 44, comprising from about 1% by weight or less to about 25% by weight of said coating agent based on the total weight of said wax-coated carbon black pellet.

46. The coated carbon black pellet of claim 44, comprising from about 1% by weight to about 5% by weight of said coating agent based on the total weight of the coated carbon black pellet.

47. A method of reducing mold fouling in a mold, comprising introducing a plurality of the coated carbon black pellets of claim 1 into a rubber or elastomeric composition.

48. A flowable composition comprising a plurality of the coated carbon black pellets of claim 1.

49. A flowable composition comprising a plurality of the coated carbon black pellets of claim 17.

* * * * *